(12) United States Patent
Nishimura et al.

(10) Patent No.: US 6,215,600 B1
(45) Date of Patent: Apr. 10, 2001

(54) ZOOM LENS

(75) Inventors: Takeshi Nishimura; Yoshinori Itoh, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/160,769

(22) Filed: Sep. 24, 1998

(30) Foreign Application Priority Data

Sep. 30, 1997 (JP) .................................................... 9-283001
Nov. 17, 1997 (JP) .................................................... 9-332481

(51) Int. Cl.$^7$ .................................................... G02B 15/14
(52) U.S. Cl. ........................... 359/689; 359/686; 359/692
(58) Field of Search .................................. 359/689, 686, 359/692

(56) References Cited

U.S. PATENT DOCUMENTS

| | | | |
|---|---|---|---|
| 4,659,186 | 4/1987 | Sato et al. | 350/423 |
| 5,044,706 | 9/1991 | Chen | 359/357 |
| 5,268,790 | 12/1993 | Chen | 359/558 |
| 5,493,441 | 2/1996 | Chipper | 359/354 |
| 5,768,030 | * 6/1998 | Estelle | 359/691 |
| 5,956,185 | * 9/1999 | Kang | 359/689 |
| 5,982,544 | 11/1999 | Ogata | 359/565 |

FOREIGN PATENT DOCUMENTS

| | | |
|---|---|---|
| 56-128911 | 10/1981 | (JP) . |
| 57-201213 | 12/1982 | (JP) . |
| 60-170816 | 9/1985 | (JP) . |
| 60-191216 | 9/1985 | (JP) . |
| 62-56917 | 3/1987 | (JP) . |
| 3-282409 | 12/1991 | (JP) . |
| 4-37810 | 2/1992 | (JP) . |
| 4-76511 | 3/1992 | (JP) . |
| 4-213421 | 8/1992 | (JP) . |
| 4-223419 | 8/1992 | (JP) . |
| 5-264903 | 10/1993 | (JP) . |
| 6-324262 | 11/1994 | (JP) . |
| 9-127321 | 5/1997 | (JP) . |
| 9-197273 | 7/1997 | (JP) . |
| 9-197274 | 7/1997 | (JP) . |

* cited by examiner

Primary Examiner—Georgia Epps
Assistant Examiner—Michael A. Lucas
(74) Attorney, Agent, or Firm—Robin, Blecker & Daley

(57) ABSTRACT

A zoom lens which includes, in order from an object side, a first lens unit of positive refractive power, a second lens unit of positive refractive power and a third lens unit of negative refractive power, wherein the first, second and third lens units are moved such that, during zooming from a wide-angle end to a telephoto end, a separation between the first lens unit and the second lens unit increases and a separation between the second lens unit and the third lens unit decreases, and wherein the zoom lens has a diffractive optical element.

67 Claims, 28 Drawing Sheets

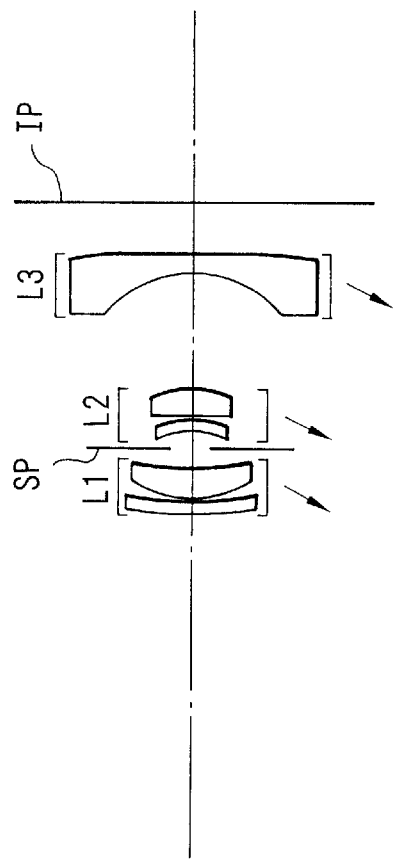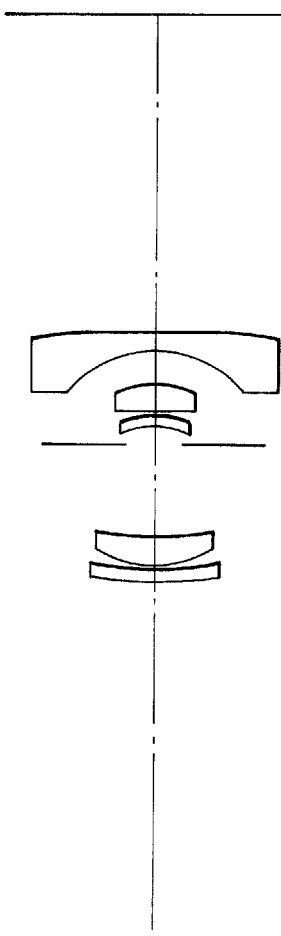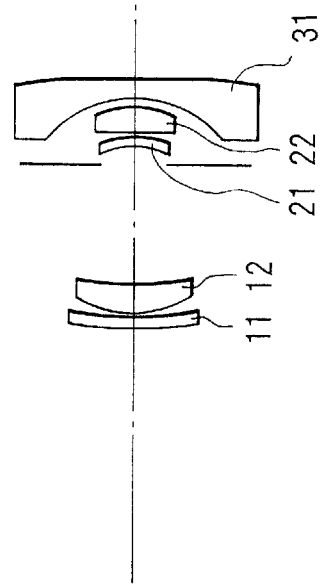
FIG. 1A
FIG. 1B
FIG. 1C

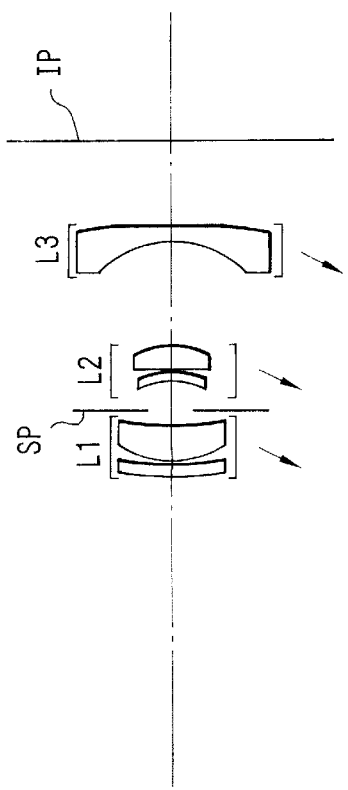
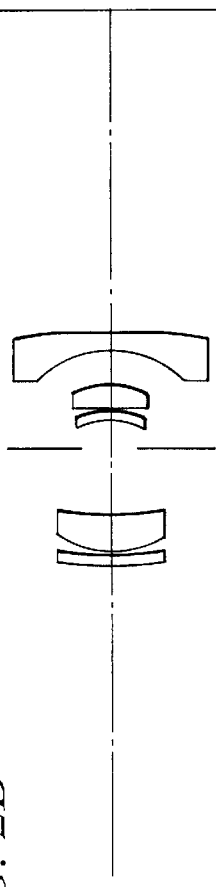
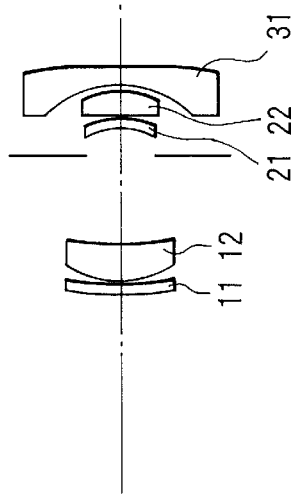
FIG. 2A
FIG. 2B
FIG. 2C

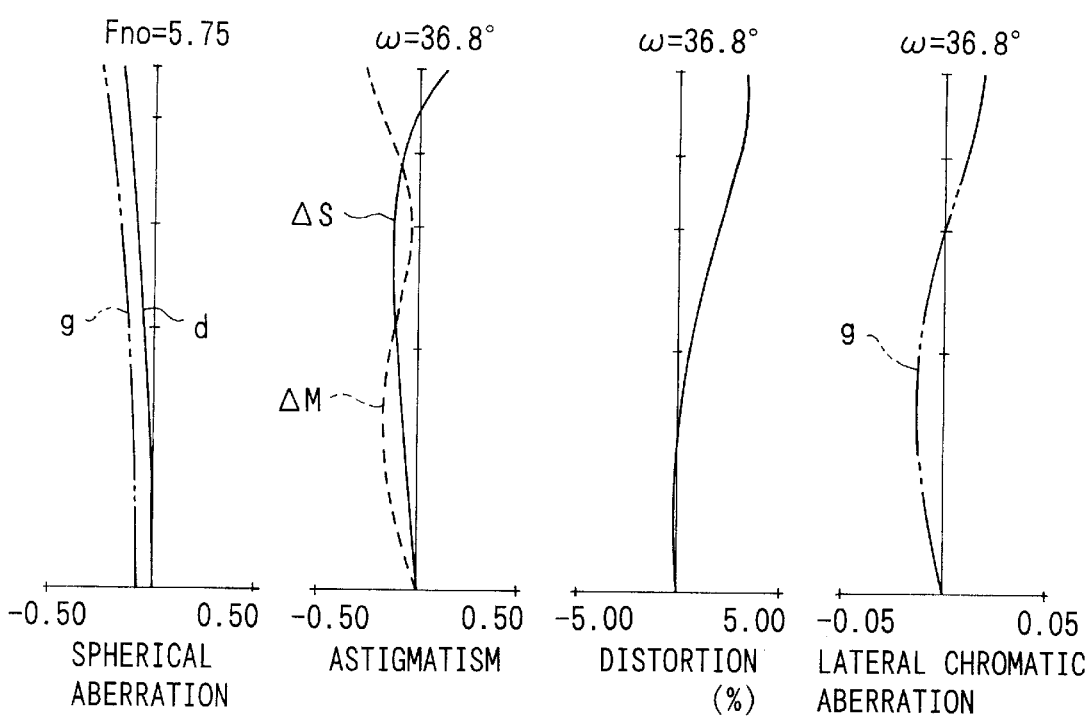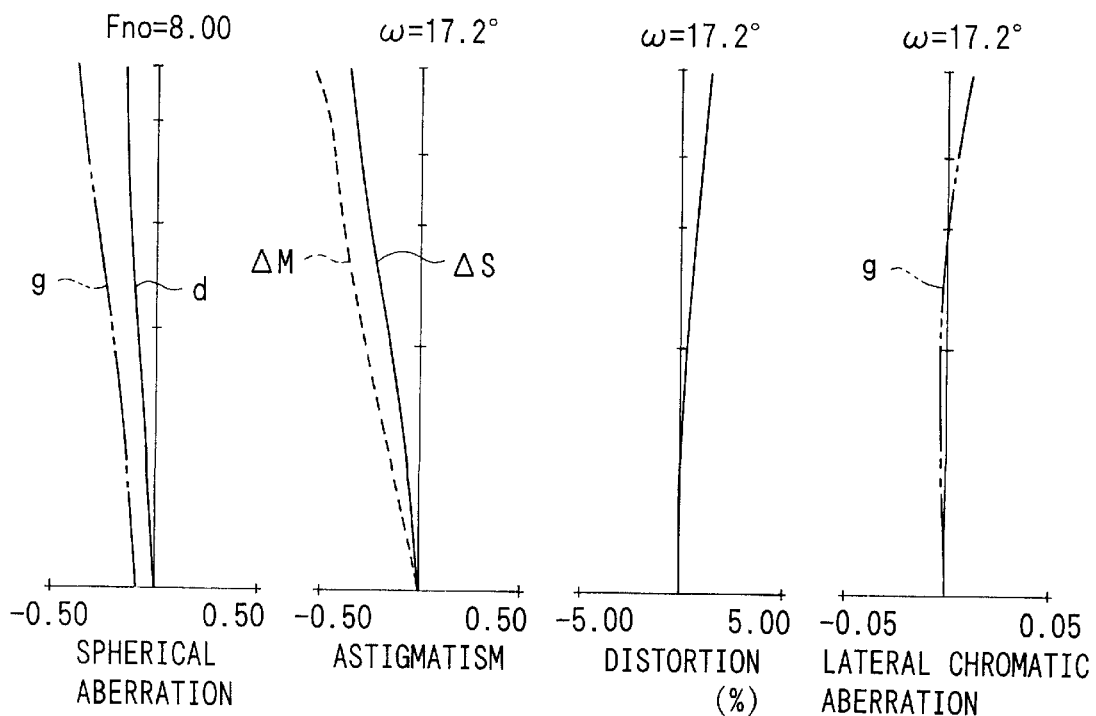

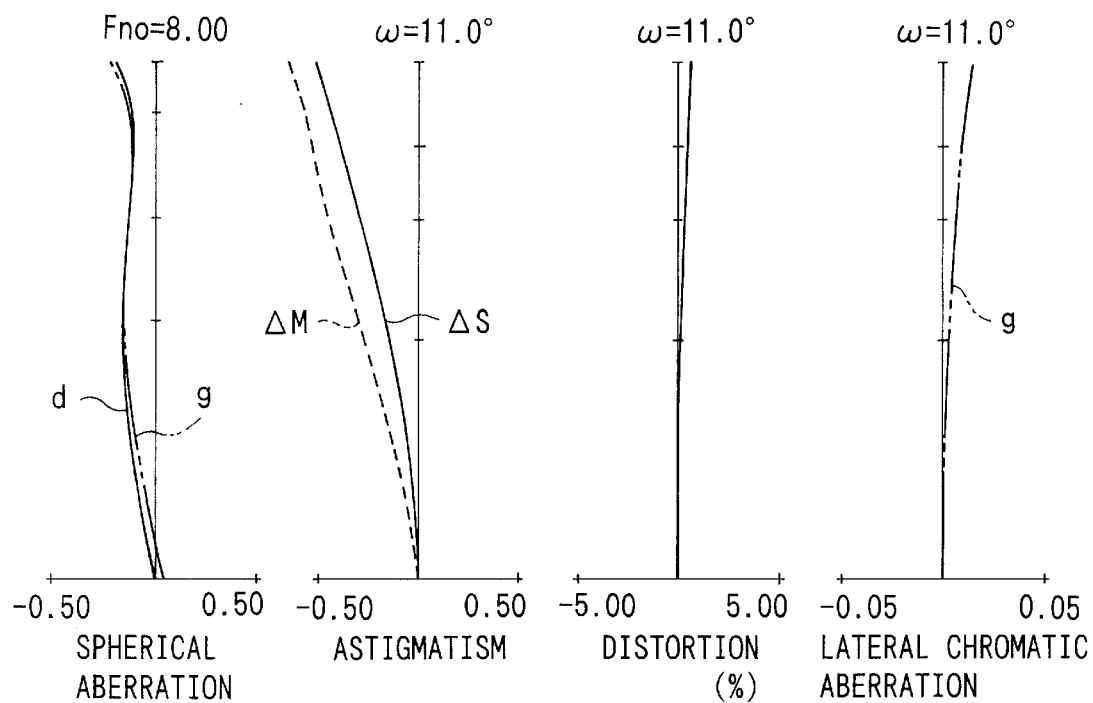
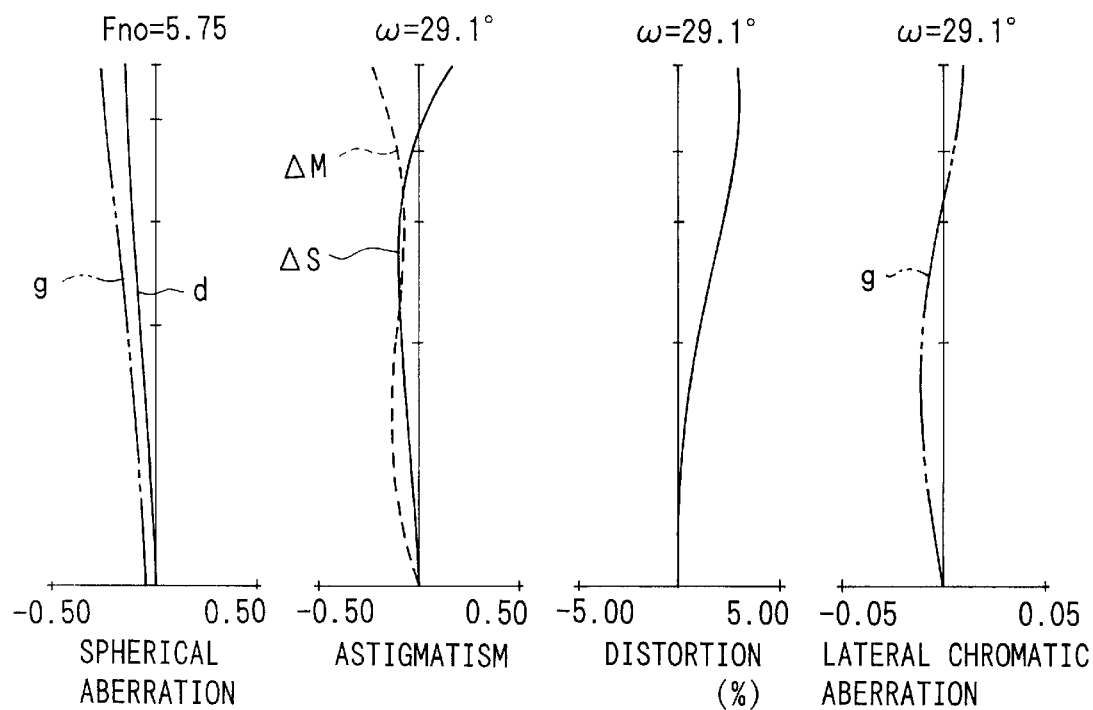

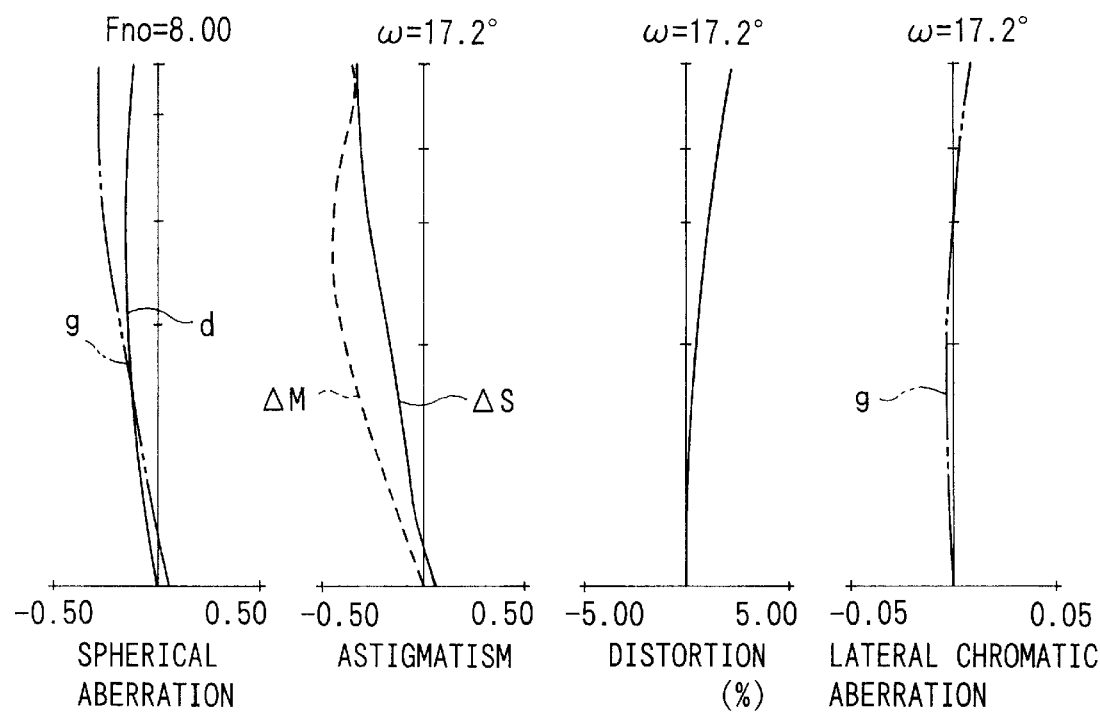
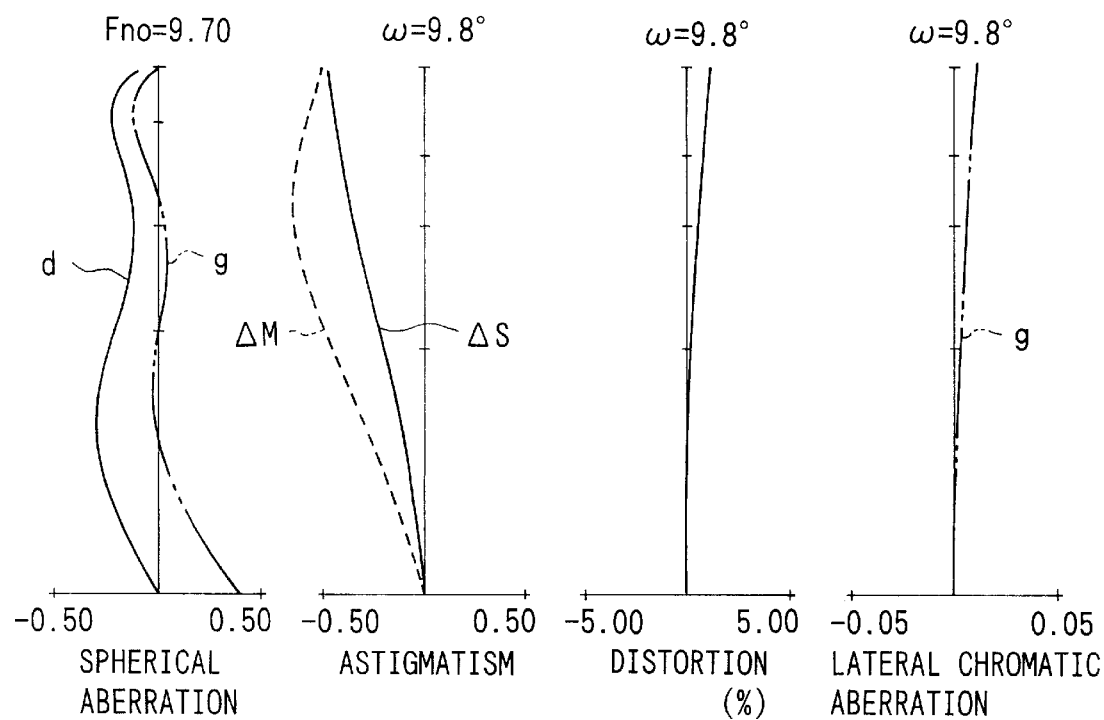

HEIGHT FROM OPTICAL
AXIS: 0mm

HEIGHT FROM OPTICAL
AXIS: 17.25mm

IMAGE HEIGHT: 0mm

IMAGE HEIGHT: 17.25mm

SPATIAL FREQUENCY (LINES/mm)

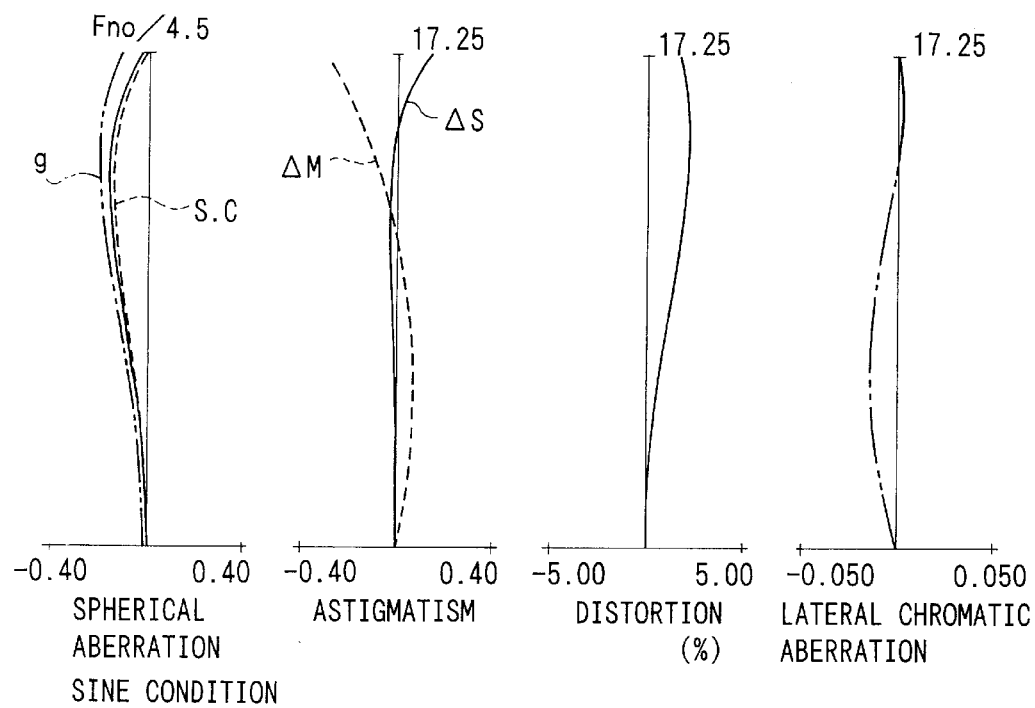
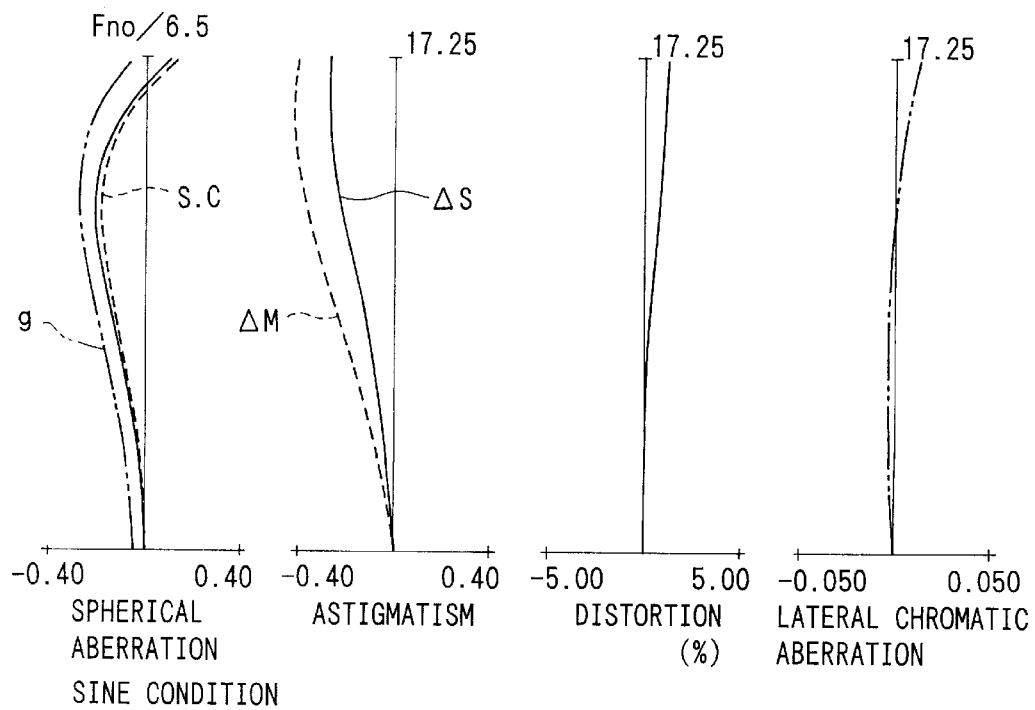

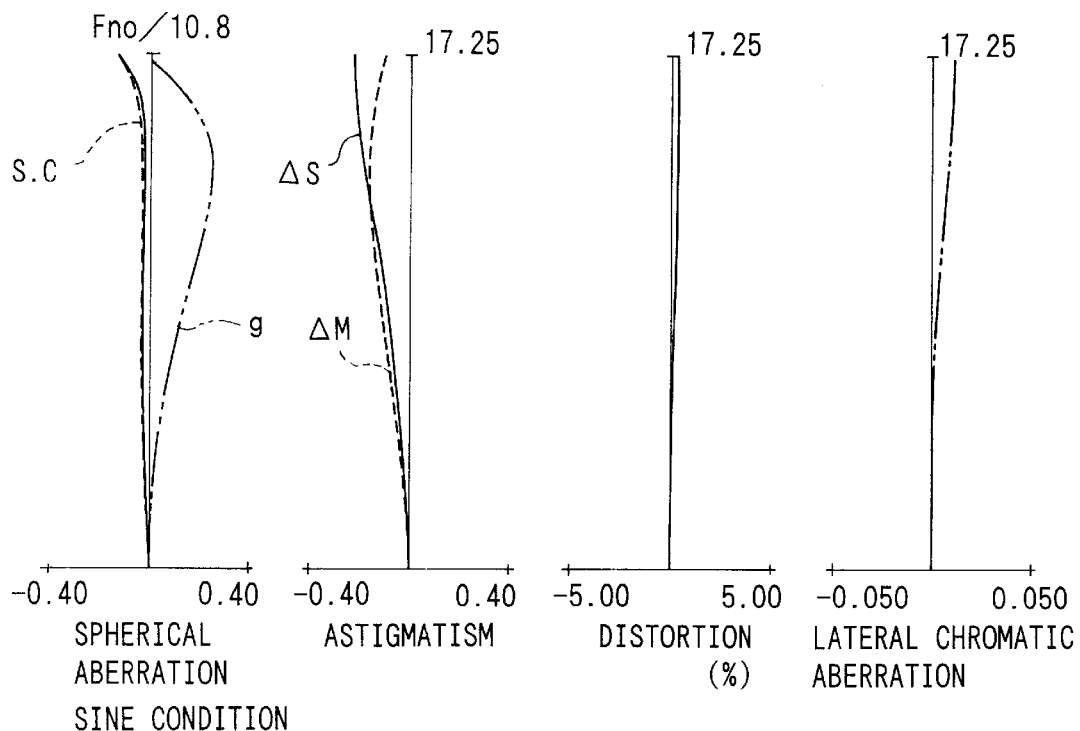
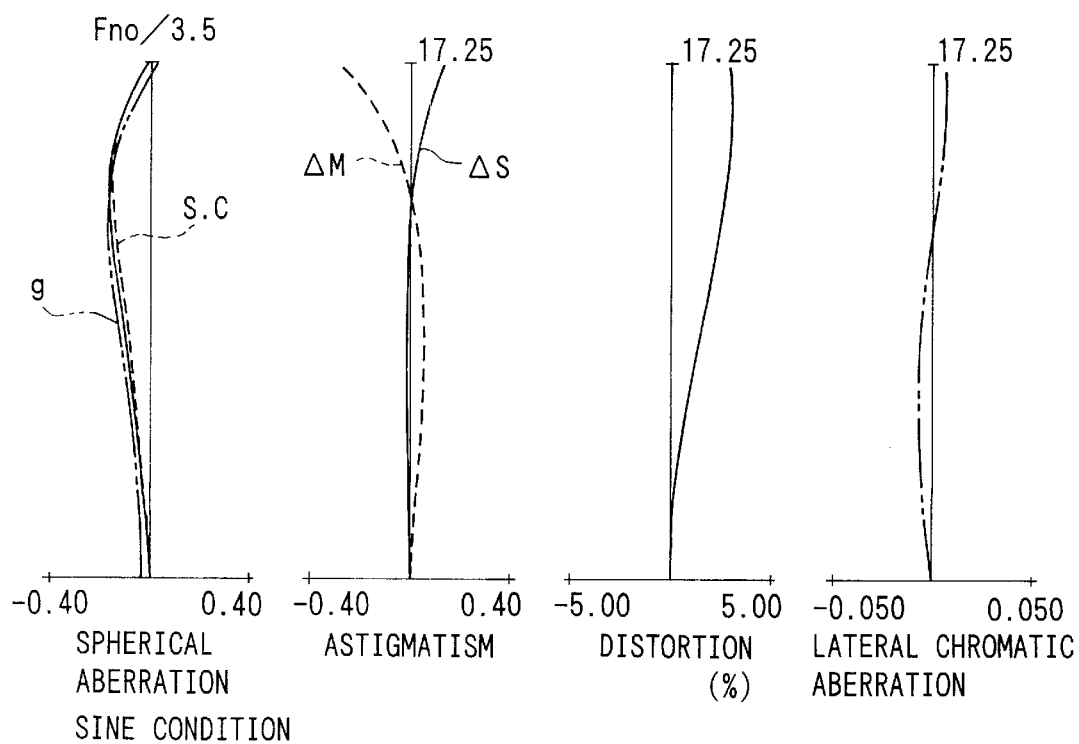

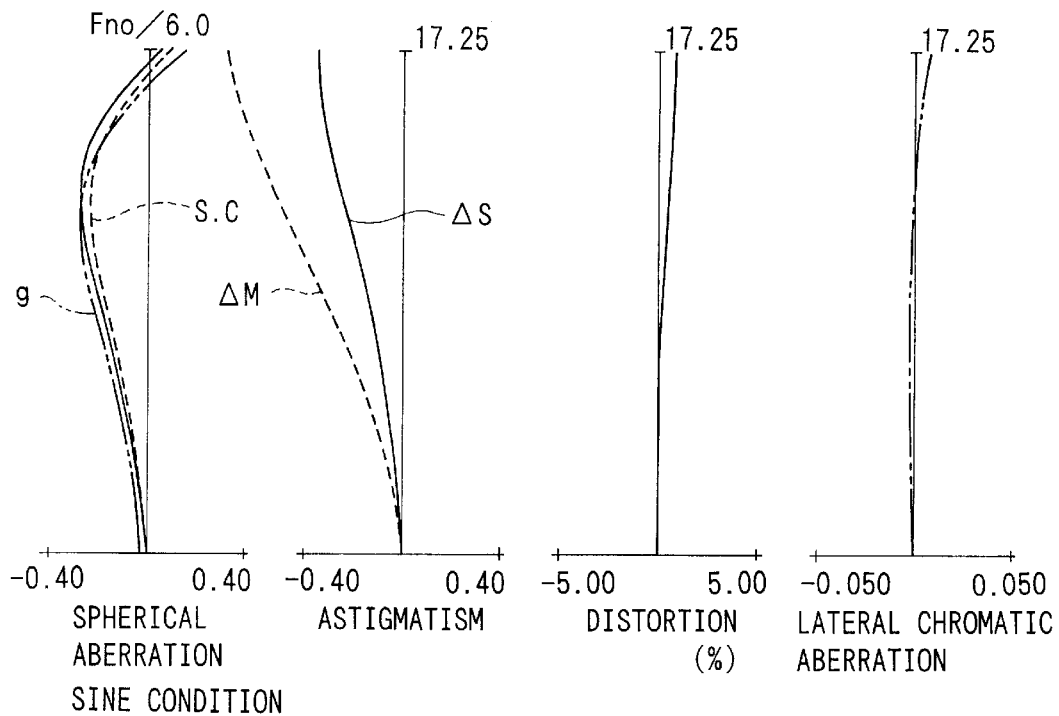
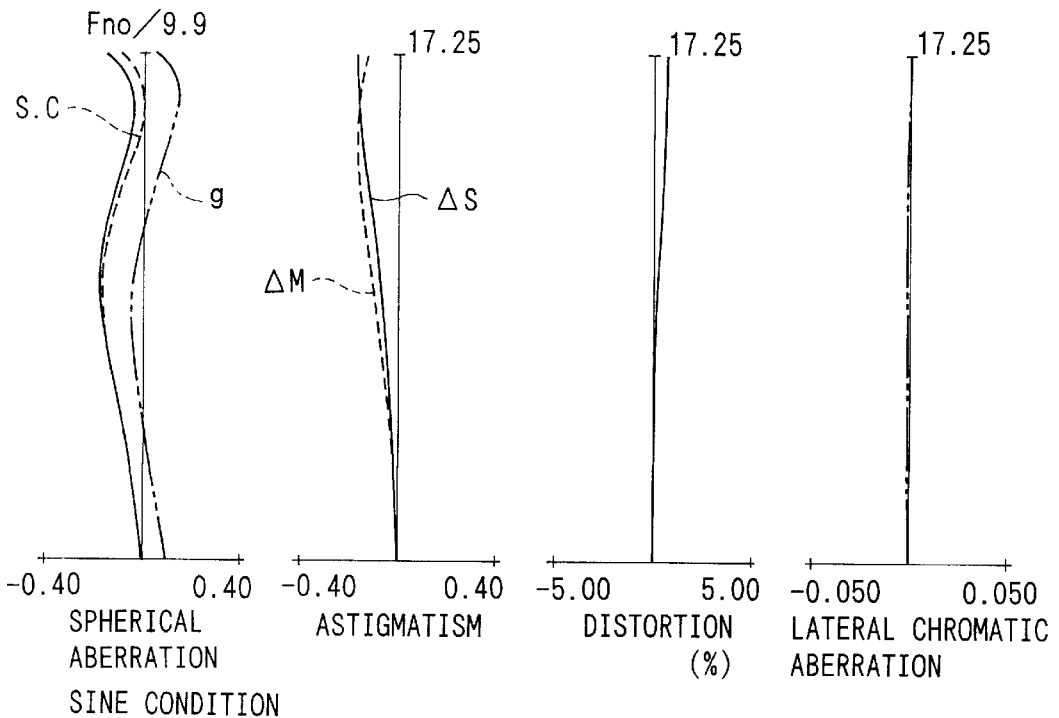

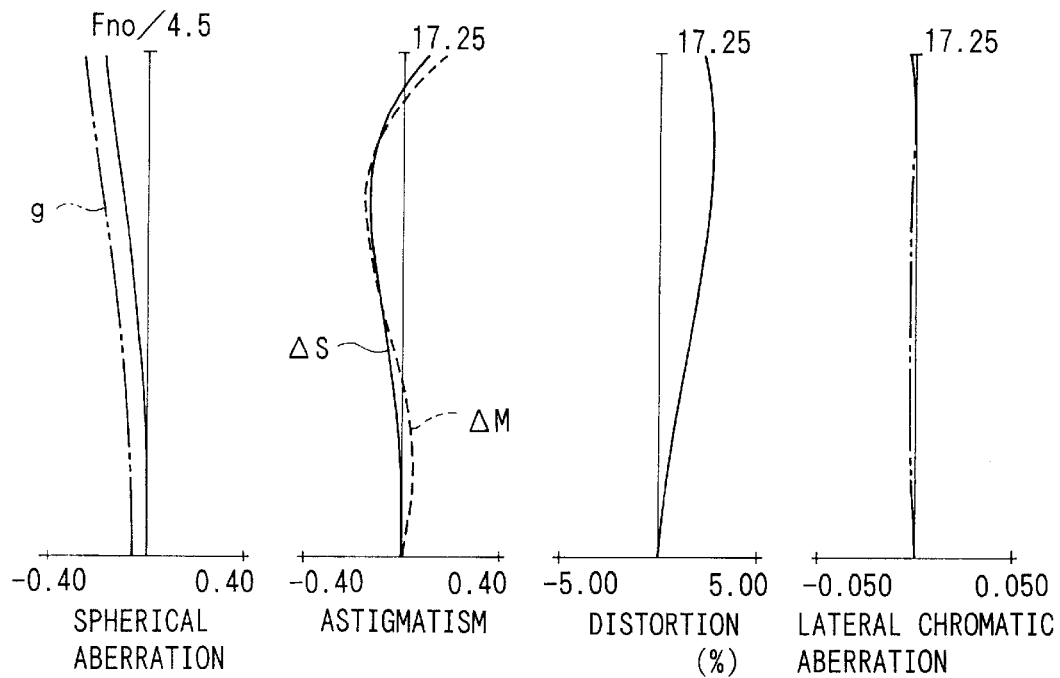
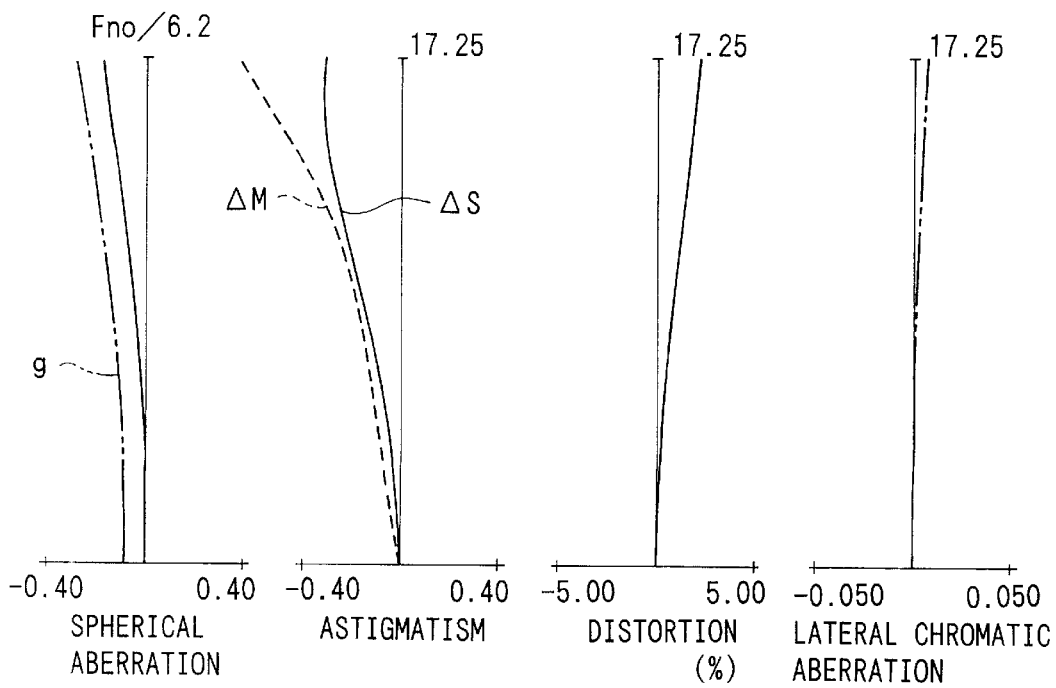

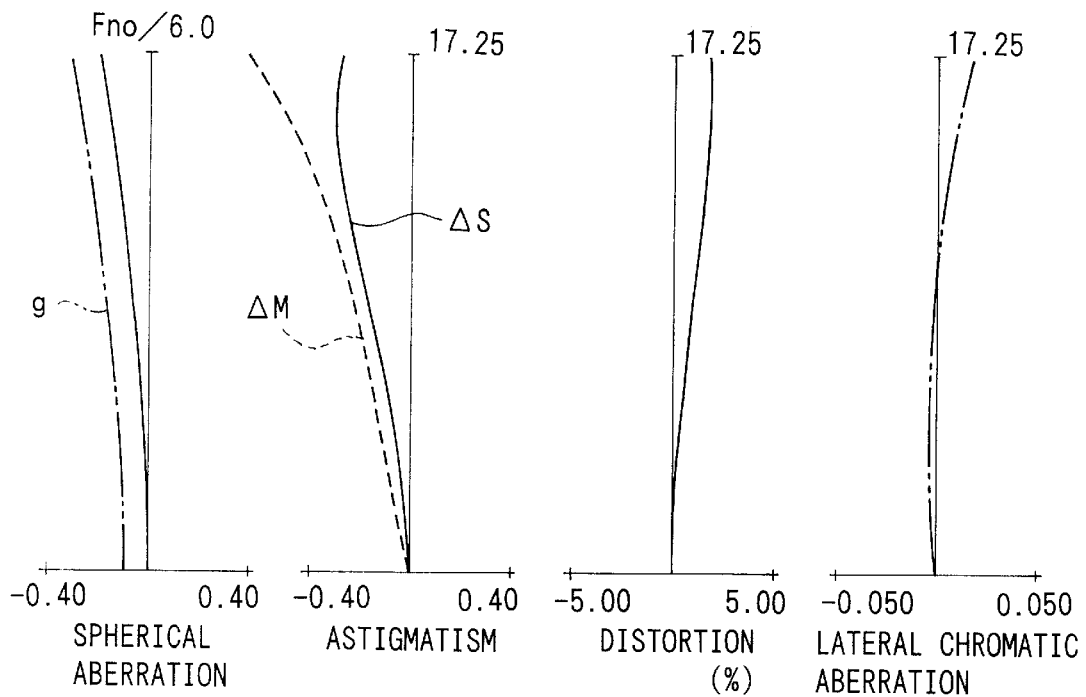
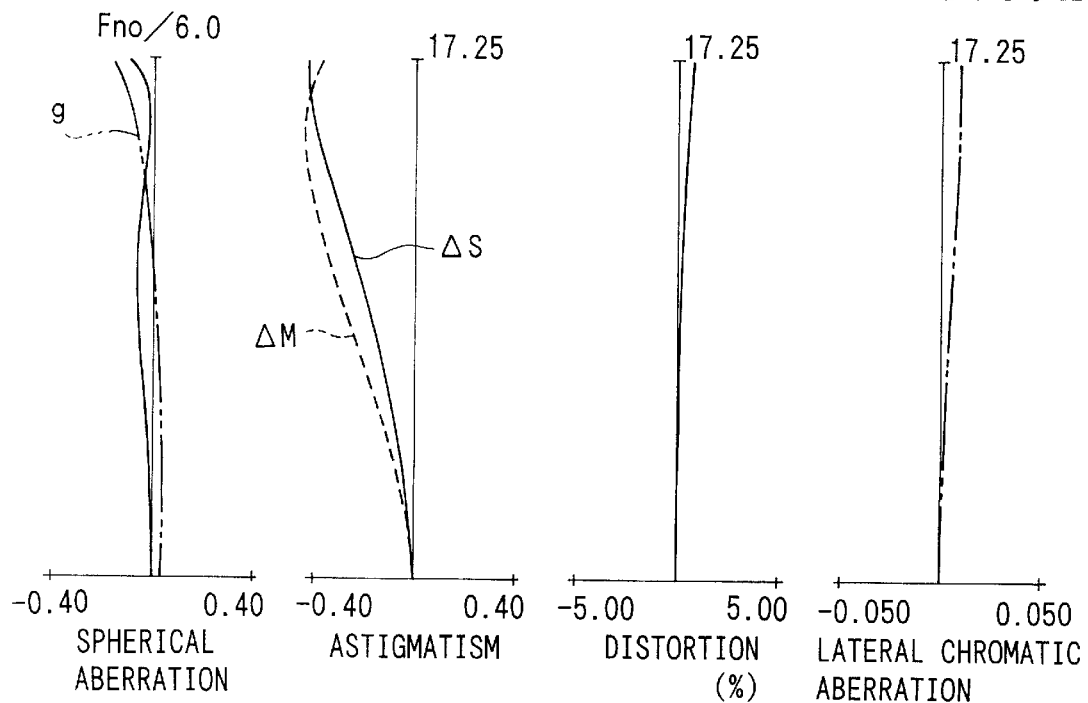

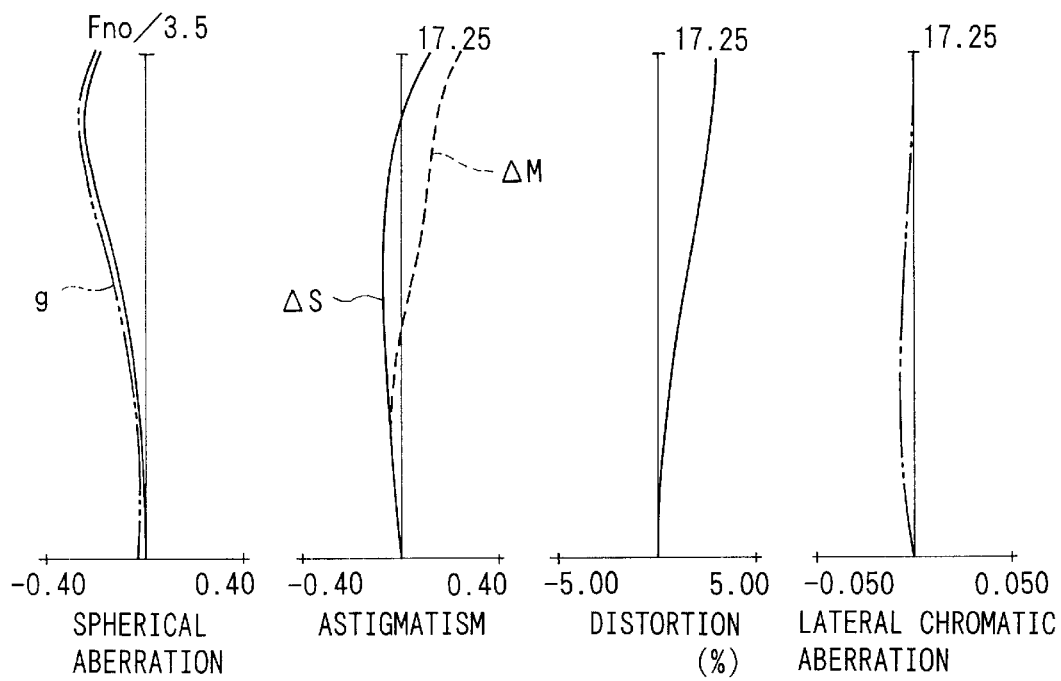
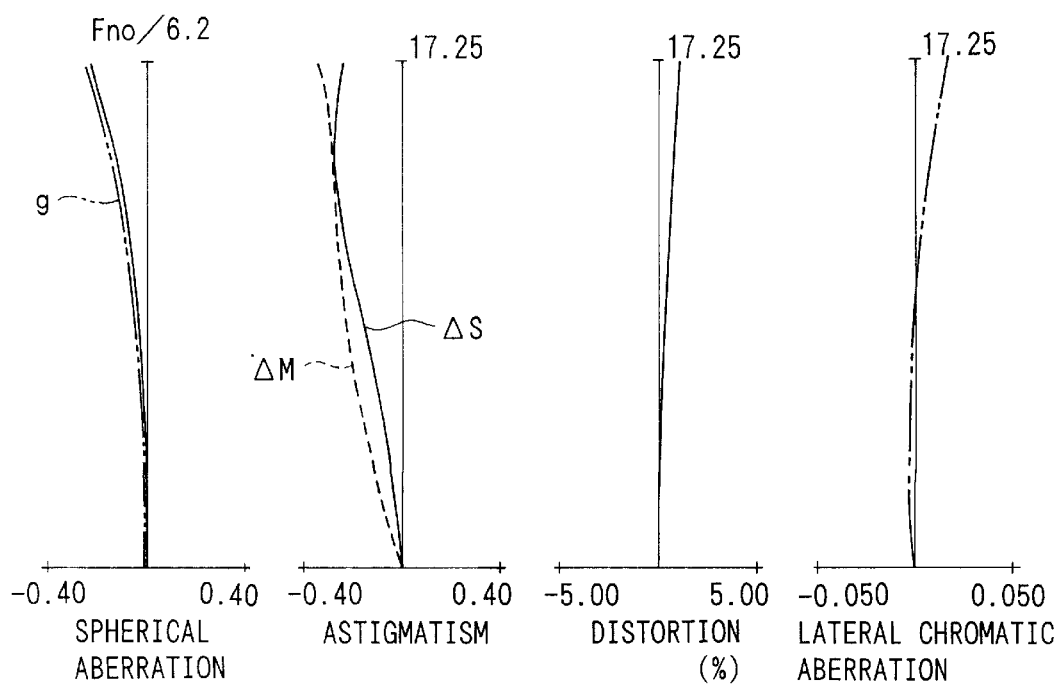

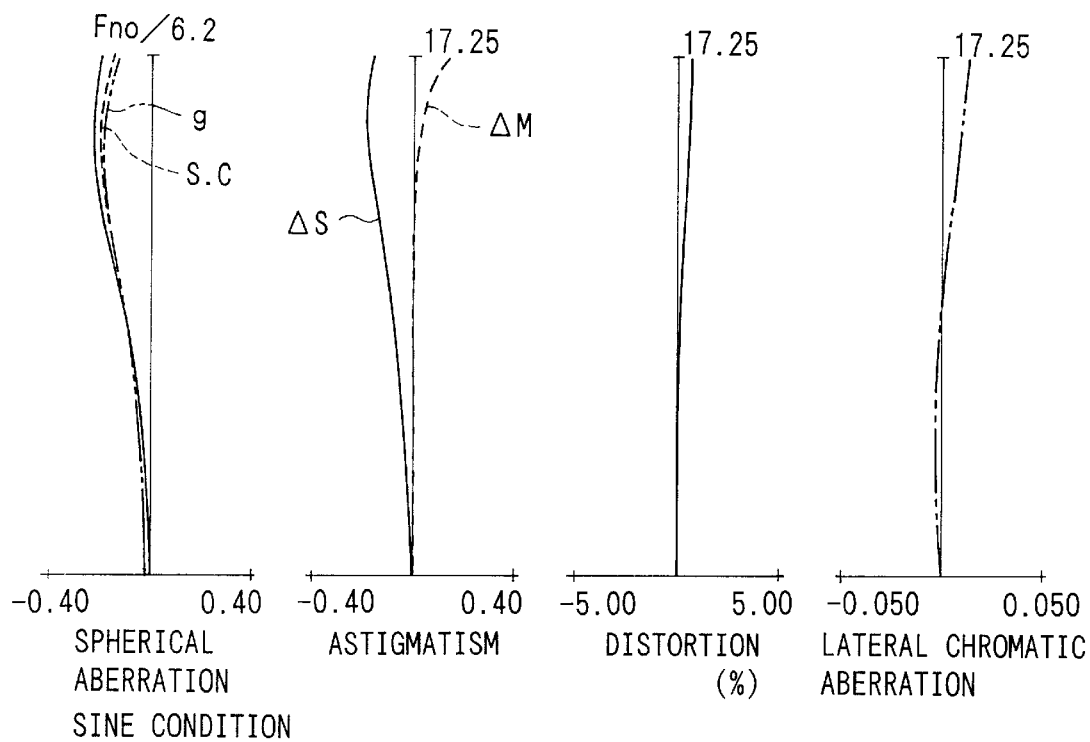
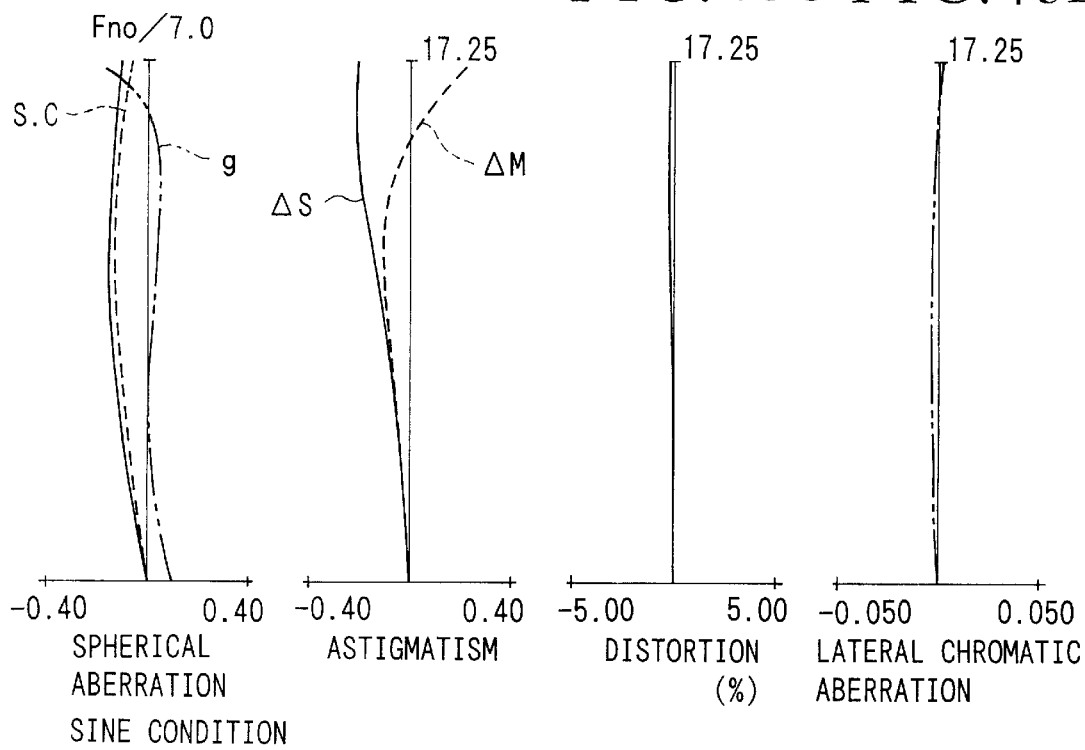

ZOOM LENS

BACKGROUND OF THE INVENTION

1. Field of the Invention

The present invention relates to zoom lenses and, more particularly, to a zoom lens having a diffractive optical element which is suited to lens-shutter cameras, video cameras, or like optical apparatuses.

2. Description of Related Art

For the lens-shutter camera or the like that does not require the long back focal distance, many zoom lenses so far proposed are of the type comprising, in order from an object side, a first lens unit of positive refractive power and a second lens unit of negative refractive power, wherein the air separation between these two lenses is varied to effect zooming.

Also, in Japanese Laid-Open Patent Applications No. Sho 56-128911, No. Sho 57-201213, No. Sho 60-170816, No. Sho 60-191216 (U.S. Pat. No. 4,659,186), No. Sho 62-56917, etc., zoom lenses which are improved to a compact form have been proposed each comprising, in order from an object side, a first lens unit of positive refractive power and a second lens unit of negative refractive power, wherein the separation between these two lens units is varied to effect zooming. As these zoom lenses employ the plus-minus refractive power arrangement in this order from the object side, the back focal distance is made relatively short. Moreover, the physical length for the telephoto end of the complete lens is shortened, while still maintaining realization of a high optical performance.

Further, as derived from the 2-unit zoom lens by dividing the first lens unit of positive refractive power into two parts of positive refractive powers, another type of zoom lens is obtained. That is, a zoom lens is constructed from three lens units in total and has a plus-plus-minus refractive power arrangement, whereby the action of varying the focal length is laid on the second and third lens units to assure a great increase of the zoom ratio. Such a 3-unit zoom lens has been proposed in, for example, Japanese Laid-Open Patent Applications No. Hei 3-282409, No. Hei 4-37810, No. Hei 4-76511, No. Hei 4-223419, No. Hei 5-264903, etc.

In the meantime, for the purpose of facilitating the correction of chromatic aberrations, it is known to provide part of an optical system with a diffractive optical element, as disclosed in Japanese Laid-Open Patent Applications No. Hei 4-213421 (U.S. Pat. No. 5,044,706), No. Hei 6-324262, No. Hei 9-19273 and No. Hei 9-197274.

BRIEF SUMMARY OF THE INVENTION

It is an object of the invention to provide a compact zoom lens having good optical performance. In particular, a good stability of the correction of chromatic aberrations has to be maintained throughout the entire zooming range. It is, therefore, another object of the invention to provide a zoom lens having a diffractive optical element of heretofore unknown form.

To attain the above objects, in accordance with an aspect of the invention, there is provided a zoom lens which comprises, in order from an object side, a first lens unit of positive refractive power, a second lens unit of positive refractive power and a third lens unit of negative refractive power, wherein the first, second and third lens units are moved such that, during zooming from a wide-angle end to a telephoto end, a separation between the first lens unit and the second lens unit increases and a separation between the second lens unit and the third lens unit decreases, and wherein the zoom lens has a diffractive optical element.

In accordance with another aspect of the invention, there is provided a zoom lens which comprises, in order from an object side, a first lens unit of positive refractive power and a second lens unit of negative refractive power, wherein an air separation between the first lens unit and the second lens unit is varied to effect zooming, and wherein the first lens unit includes at least three lenses and the first lens unit has a diffractive optical element.

In accordance with a further aspect of the invention, there is provided a zoom lens which comprises, in order from an object side to an image side, a first lens unit of positive refractive power and a second lens unit of negative refractive power, wherein an air separation between the first lens unit and the second lens unit is varied to effect zooming, and wherein the first lens unit has a positive lens disposed closest to the object side and a negative lens disposed closer to the image side than the positive lens, and the zoom lens has a diffractive optical element.

In accordance with a further aspect of the invention, there is provided a zoom lens which comprises, in order from an object side, a first lens unit of positive refractive power and a second lens unit of negative refractive power, wherein an air separation between the first lens unit and the second lens unit is varied to effect zooming, and wherein the first lens unit has two positive lenses and two negative lenses and the first lens unit has a diffractive optical element.

In accordance with a further aspect of the invention, there is provided a zoom lens which comprises, in order from an object side, a first lens unit of positive refractive power and a second lens unit of negative refractive power, wherein an air separation between the first lens unit and the second lens unit is varied to effect zooming, and wherein the first lens unit has one positive lens and two negative lenses, and the first lens unit has a diffractive optical element.

In accordance with a further aspect of the invention, there is provided a zoom lens which comprises, in order from an object side to an image side, a first lens unit of positive refractive power and a second lens unit of negative refractive power, wherein an air separation between the first lens unit and the second lens unit is varied to effect zooming, and wherein a stop is disposed within the first lens unit and, when the first lens unit is divided into a front lens sub-unit closer to the object side than the stop and a rear lens sub-unit disposed closer to the image side than the stop, the rear lens sub-unit has a diffractive optical element.

These and further objects and aspects of the invention will become apparent from the following detailed description of preferred embodiments thereof taken in conjunction with the accompanying drawings.

BRIEF DESCRIPTION OF THE SEVERAL VIEWS OF THE DRAWING

FIGS. 1A, 1B and 1C are longitudinal section views of a numerical example 1 of the zoom lens in three operative positions.

FIGS. 2A, 2B and 2C are longitudinal section views of a numerical example 2 of the zoom lens in three operative positions.

FIGS. 4A, 4B, 4C and 4D are graphic representations of the aberrations of the zoom lens of the numerical example 1 in the wide-angle end.

FIGS. 5A, 5B, 5C and 5D are graphic representations of the aberrations of the zoom lens of the numerical example 1 in a middle focal length position.

FIGS. 6A, 6B, 6C and 6D are graphic representations of the aberrations of the zoom lens of the numerical example 1 in the telephoto end.

FIGS. 7A, 7B, 7C and 7D are graphic representations of the aberrations of the zoom lens of the numerical example 2 in the wide-angle end.

FIGS. 8A, 8B, 8C and 8D are graphic representations of the aberrations of the zoom lens of the numerical example 2 in a middle focal length position.

FIGS. 9A, 9B, 9C and 9D are graphic representations of the aberrations of the zoom lens of the numerical example 2 in the telephoto end.

FIGS. 28A, 28B, 28C and 28D are graphic representations of the aberrations of the zoom lens of the numerical example 4 in the wide-angle end.

FIGS. 29A, 29B, 29C and 29D are graphic representations of the aberrations of the zoom lens of the numerical example 4 in a middle focal length position.

FIGS. 30A, 30B, 30C and 30D are graphic representations of the aberrations of the zoom lens of the numerical example 4 in the telephoto end.

FIGS. 31A, 31B, 31C and 31D are graphic representations of the aberrations of the zoom lens of the numerical example 5 in the wide-angle end.

FIGS. 32A, 32B, 32C and 32D are graphic representations of the aberrations of the zoom lens of the numerical example 5 in a middle focal length position.

FIGS. 33A, 33B, 33C and 33D are graphic representations of the aberrations of the zoom lens of the numerical example 5 in the telephoto end.

FIGS. 34A, 34B, 34C and 34D are graphic representations of the aberrations of the zoom lens of the numerical example 6 in the wide-angle end.

FIGS. 35A, 35B, 35C and 35D are graphic representations of the aberrations of the zoom lens of the numerical example 6 in a middle focal length position.

FIGS. 38A, 38B, 38C and 38D are graphic representations of the aberrations of the zoom lens of the numerical example 7 in a middle focal length position.

FIGS. 39A, 39B, 39C and 39D are graphic representations of the aberrations of the zoom lens of the numerical example 7 in the telephoto end.

FIGS. 40A, 40B, 40C and 40D are graphic representations of the aberrations of the zoom lens of the numerical example 8 in the wide-angle end.

FIGS. 41A, 41B, 41C and 41D are graphic representations of the aberrations of the zoom lens of the numerical example 8 in a middle focal length position.

FIGS. 44A, 44B, 44C and 44D are graphic representations of the aberrations of the zoom lens of the numerical example 9 in a middle focal length position.

FIGS. 45A, 45B, 45C and 45D are graphic representations of the aberrations of the zoom lens of the numerical example 9 in the telephoto end.

DETAILED DESCRIPTION OF THE INVENTION

Hereinafter, preferred embodiments of the invention will be described in detail with reference to the drawings.
(First Embodiment)

FIGS. 1A to 1C through FIGS. 3A to 3C are lens block diagrams respectively showing three numerical examples 1 to 3 of zoom lenses according to a first embodiment thereof (whose numerical data are to be described later).

FIGS. 4A to 4D through FIGS. 6A to 6D show the aberrations of the zoom lens of the numerical example 1 in the wide-angle end, the middle focal length position and the telephoto end, respectively. FIGS. 7A to 7D through FIGS. 9A to 9D show the aberrations of the zoom lens of the numerical example 2 in the wide-angle end, the middle focal length position and the telephoto end, respectively. FIGS. 10A to 10D through FIGS. 12A to 12D show the aberrations of the zoom lens of the numerical example 3 in the wide-angle end, the middle focal length position and the telephoto end, respectively. In the lens block diagrams, FIGS. 1A, 2A and 3A show the arrangement in the wide-angle end, FIGS. 1B, 2B and 3B in the middle focal length position and FIGS. 1C, 2C and 3C in the telephoto end.

Figure 3A:
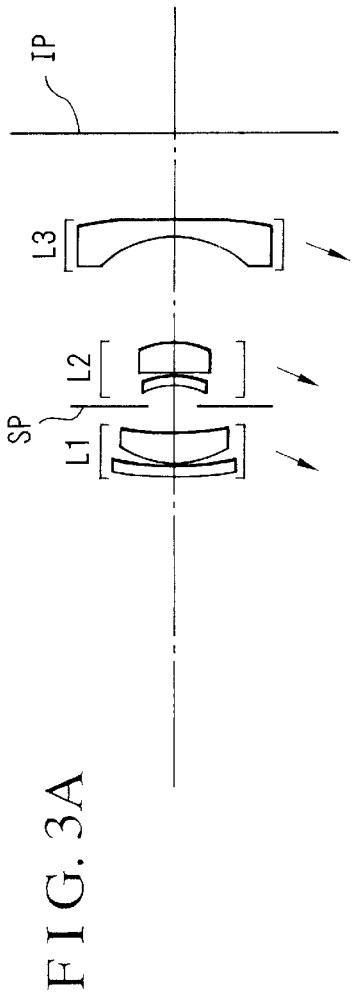
FIGS. 3A, 3B and 3C are longitudinal section views of a numerical example 3 of the zoom lens in three operative positions.
Figure 3B:
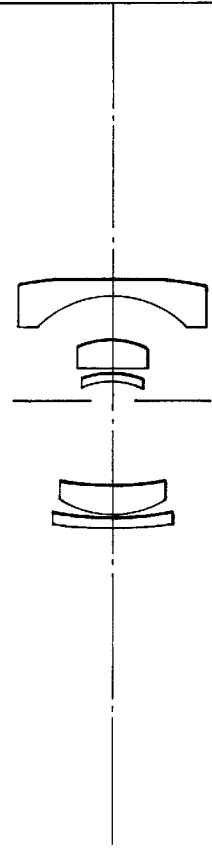
Figure 3C:
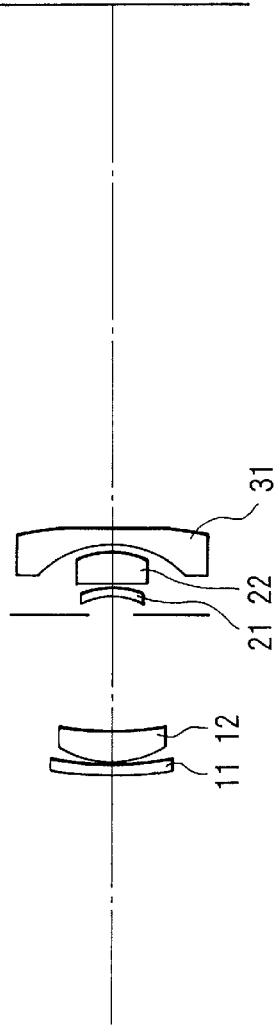
Figures 10A, 10B, 10C, 10D:
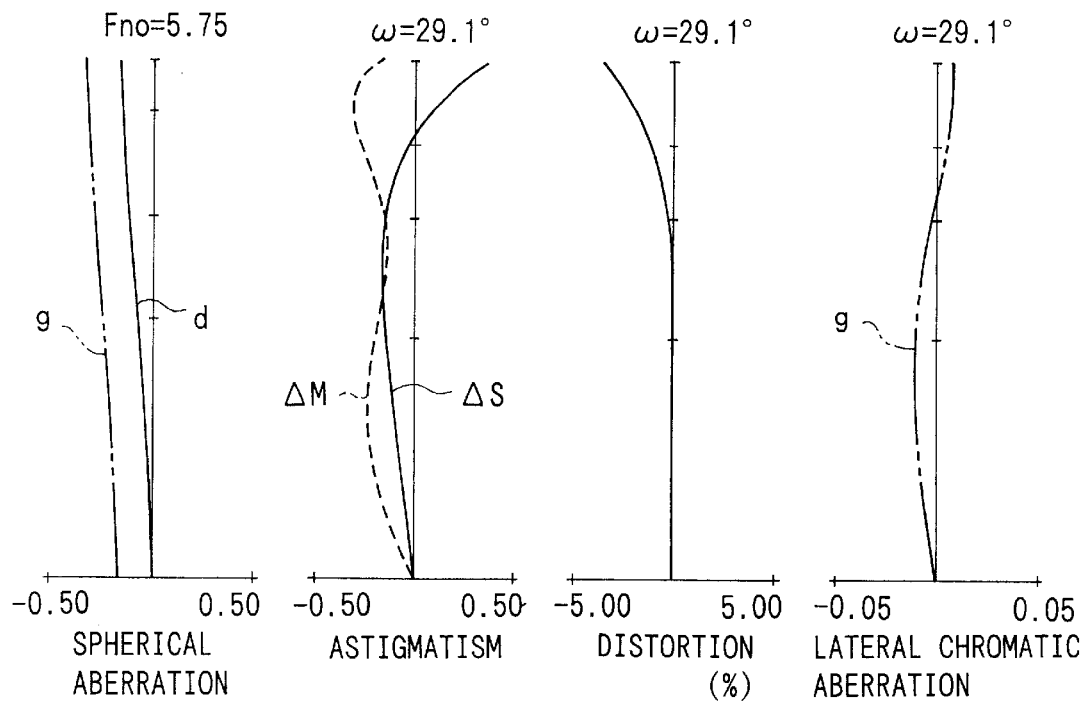
FIGS. 10A, 10B, 10C and 10D are graphic representations of the aberrations of the zoom lens of the numerical example 3 in the wide-angle end.
Figures 11A, 11B, 11C, 11D:
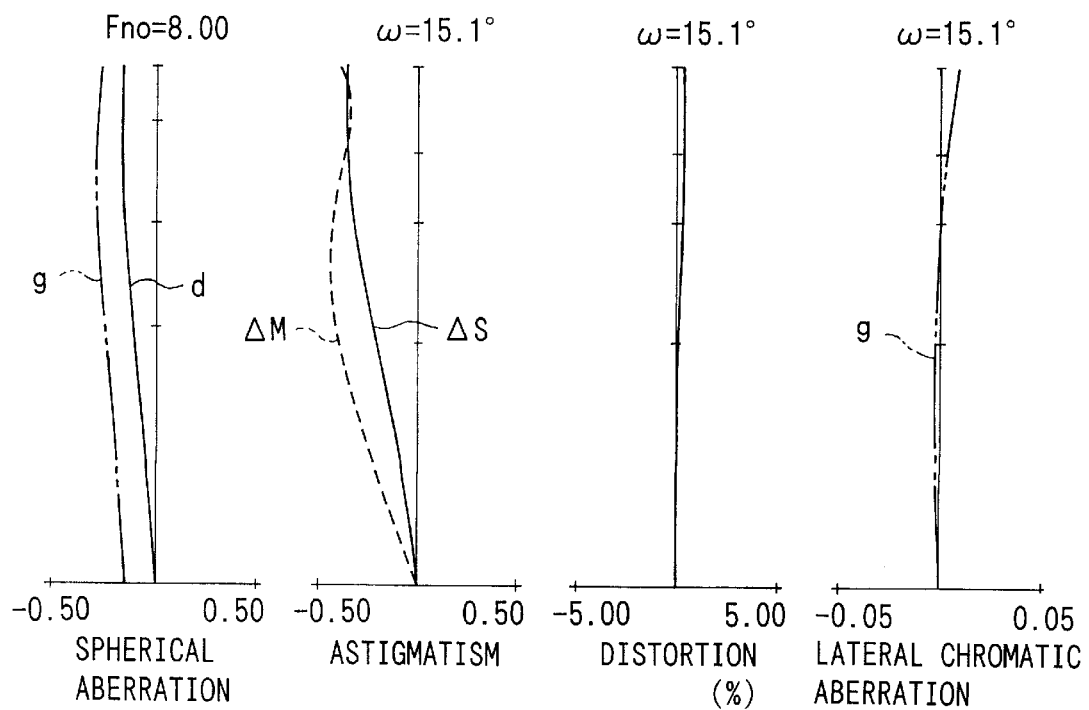
FIGS. 11A, 11B, 11C and 11D are graphic representations of the aberrations of the zoom lens of the numerical example 3 in a middle focal length position.
Figures 12A, 12B, 12C, 12D:
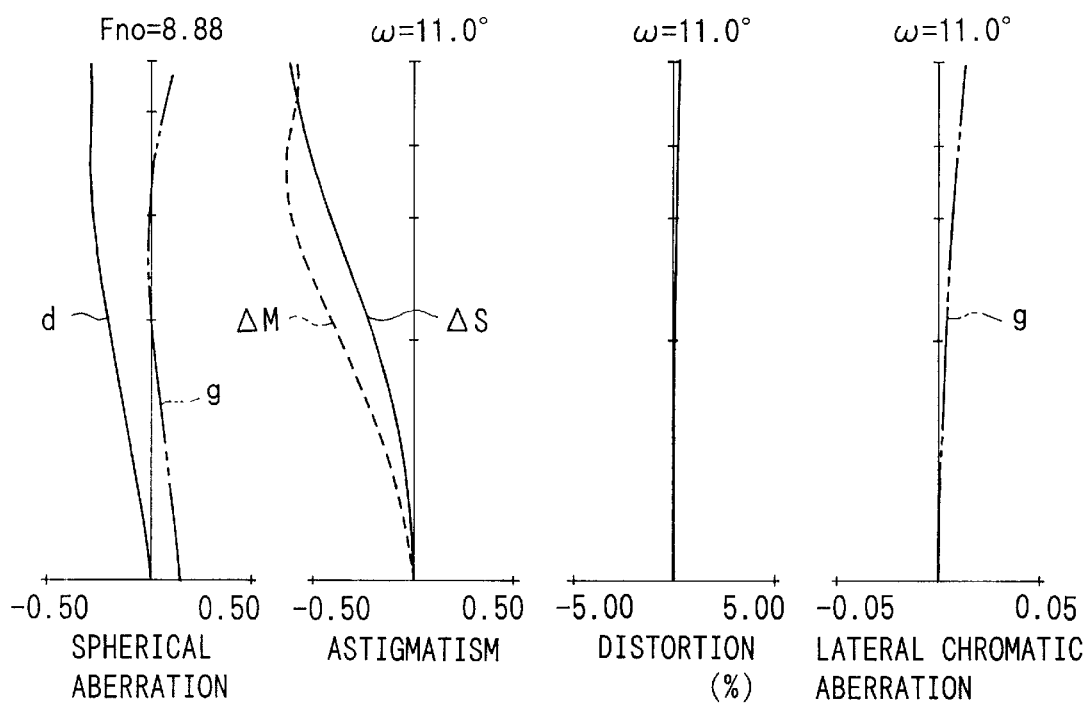
FIGS. 12A, 12B, 12C and 12D are graphic representations of the aberrations of the zoom lens of the numerical example 3 in the telephoto end.

In FIGS. 1A, 2A and 3A, a zoom lens comprises, in order from an object side, a first lens unit L1 of positive refractive power, a second lens unit L2 of positive refractive power and a third lens unit of negative refractive power. SP stands for a stop, and IP stands for an image plane.

The arrows indicate the directions of movement of all the lens units with the loci thereof, during zooming from the wide-angle end to the telephoto end.

The present embodiment sets forth appropriate rules of design for the refractive powers of the first to third lens units to move all the lens units toward the object side in such relation that, during zooming from the wide-angle end to the telephoto end, the air separation between the first and second lens units increases and the air separation between the second and third lens units decreases.

With this arrangement of the zoom lens, the function of varying the focal length is laid on the second and third lens units. Particularly, the third lens unit is made to contribute to a largest proportion of the variation of the focal length. The predetermined zoom ratio is thus secured with ease. Then, provision is made for facilitating correction of chromatic aberrations by using a diffractive optical element in the second lens unit or each of the second and third lens units. This assures maintenance of good stability of aberrations against zooming. A zoom lens of high optical performance is thus obtained.

In the zoom lenses of the numerical examples 1 to 3, the first lens unit L1 is constructed with two lenses, i.e., a negative lens 11 of meniscus form convex toward the object side and a positive lens 12 of meniscus form convex toward the object side.

The second lens unit L2 is constructed also with two lenses, i.e., a negative lens 21 of meniscus form convex toward the image side and a positive lens 22 having a convex surface facing the image side.

The third lens unit L3 is constructed with one lens, i.e., a negative lens 31 having a concave surface facing the object side.

In the zoom lenses of the numerical examples 1 and 2 shown in FIGS. 1A to 1C and FIGS. 2A to 2C, respectively, a surface on the object side of the negative lens 21 in the second lens unit L2 and a surface on the object side of the negative lens 31 in the third lens unit L3 are provided with respective diffractive optical elements for correcting chromatic aberrations. In the zoom lens of the numerical example 3 shown in FIGS. 3A to 3C, a surface on the object side of the negative lens 31 in the third lens unit L3 is provided with a diffractive optical element for correcting chromatic aberrations.

The stop SP is positioned on the object side of the second lens unit L2 and arranged to move together with the second lens unit L2 during zooming.

In the present embodiment, in order to minimize the bulk and size of the zoom lens, the zoom type and the construction and arrangement of the constituent lenses are specified as described above. The variation with zooming of aberrations, especially chromatic aberrations, is corrected well, thereby obtaining a high optical performance over the entire zooming range.

To further improve the aberration correction, the present embodiment sets forth the following additional features or conditions. It is preferred to satisfy at least one of them.

(A) For the third lens unit, the diffractive optical element to be used is formed to a diffraction grating of revolution symmetry with respect to the optical axis. As the phase $\phi(H)$ of the diffraction grating (diffractive optical surface) is given by the following expression:

$$\phi(h) = (2\pi/\lambda) \cdot (C2 \cdot h^2 + C4 \cdot h^4 + C6 \cdot h^6 + \ldots + Ci \cdot h^i)$$

where h is the height from the optical axis, $\lambda$ is the wavelength, and Ci is the phase coefficient for the term in the i-th degree, the following condition is satisfied:

$$C2 > 0 \tag{1}$$

The inequality of condition (1) represents that the diffractive optical surface in the third lens unit is negative in power. By satisfying the condition (1), the longitudinal chromatic aberration mainly in the telephoto region is corrected well.

(B) Another phase coefficient C4 cited above lies in the following range:

$$C4 < 0 \tag{2}$$

It is more preferred that this conditions is satisfied under the first condition (1). The inequality of condition (2) exhibits that the negative power gradually weakens toward the margin of the diffractive optical surface. By satisfying the condition (2), the lateral chromatic aberration mainly in the wide-angle region is corrected well.

(C) The focal length Fbo of the diffractive optical surface of the diffractive optical element in the third lens unit lies within the following range:

$$-40 < Fbo/fw < -5 \tag{3}$$

where fw is the focal length in the wide-angle end of the entire lens system.

The inequalities of condition (3) give a range for the ratio of the focal length of the diffractive optical surface to the focal length for the wide-angle end of the entire lens system and have an aim chiefly to effectively correct the variation with zooming of chromatic aberrations. Incidentally, it is more preferred on aberration correction to alter the range of the inequalities of condition (3) as follows:

$$-25 < Fbo/fw < -8 \tag{3a}$$

(D) For the second and third lens units, the diffractive optical elements to be used are formed to diffraction gratings of revolution symmetry with respect to the optical axis. As the phase $\phi n(H)$ of the diffraction grating (diffractive optical surface) in the n-th lens unit is given by the following expression:

$$\phi n(h) = (2\pi/\lambda) \cdot (C2\_n \cdot h^2 + C4\_n \cdot h^4 + C6\_n \cdot h^6 + \ldots)$$

where h is the height from the optical axis, $\lambda$ is the wavelength, and Ci_n is the phase coefficient for the term in the i-th degree of the n-th lens unit, the following condition is satisfied:

$$C2\_2 * C2\_3 < 0 \tag{4}$$

where * represents multiplication.

As two diffractive optical elements are used in the second and third lens units, the inequality of condition (4) is concerned with the signs of the powers the diffractive optical surfaces should have, indicating that the powers of the diffractive optical surfaces in the second and third lens units are of different signs from each other.

In a case where the two diffractive optical elements are used in the second and third lens units of opposite refractive powers, therefore, the powers of both diffractive optical surfaces strengthen each other, so that both lens units suppress each other's chromatic aberrations. Good correction of the aberrations is thus achieved.

The zoom lenses of the numerical examples 1 and 2 satisfy all the conditions (A) to (D). The zoom lens of the numerical example 3 satisfies the conditions (A) to (C).

Figure 13:
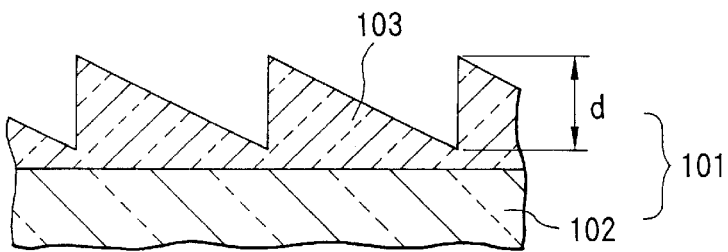
FIG. 13 is a sectional view of a monolayer diffractive optical element.
Figure 16:
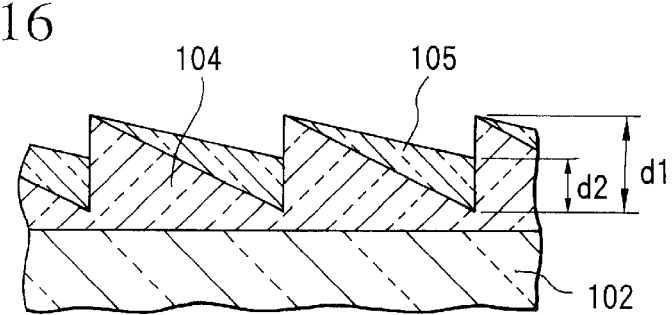
FIG. 16 is a sectional view of a diffractive optical element of the laminated type

By the way, in the present embodiment, the diffraction optical element to be used is constructed in the kinoform shown in FIG. 13. Another type having two diffraction gratings of different thicknesses from each other (or, of the same thickness) stacked as shown in FIG. 16, i.e., the laminated type, is also applicable.

Figure 14:
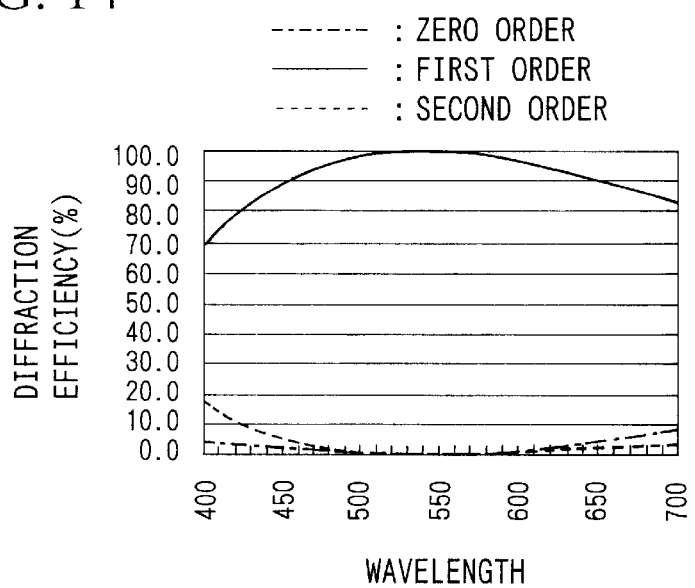
FIG. 14 is a graph for explaining the wavelength-dependent characteristic of the diffractive optical element shown in FIG. 13.

FIG. 14 shows the wavelength-dependent characteristics of the diffraction efficiency for the first-order diffracted rays in the diffractive optical element 101 shown in FIG. 13. The actual structure of construction of the diffractive optical element 101 is a layer of ultra-violet ray setting resin on the surface of a substrate 102, in which a diffraction grating 103 is formed to such a thickness "d" that the diffraction efficiency of the first-order diffracted rays becomes 100% at a wavelength of 530 μm.

As is apparent from FIG. 14, the diffraction efficiency in the design order decreases as the wavelength goes away from an optimized value of 530 μm. Meanwhile, in the neighborhood of the design order, i.e., in the zero and second orders, the diffraction efficiency of the diffracted rays increases. Such an increase of the diffracted rays in the other orders than the design one causes production of flare and leads to lower the resolving power of the optical system.

Figure 15:
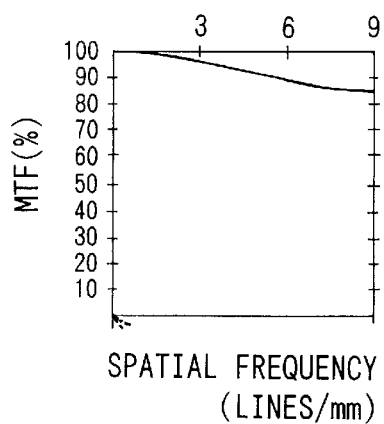
FIG. 15 is a graph of the MTF characteristics of the zoom lens of the numerical example 1 using the diffractive optical element shown in FIG. 13.

FIG. 15 shows another characteristic of the zoom lens of the numerical example 1 when using the diffractive optical element in the form of the grating of FIG. 13, where the MTF (Modulation Transfer Function) is plotted versus the spatial frequency. As is apparent from FIG. 15, the MTF characteristic slightly drops in the low frequency region.

Figure 17:
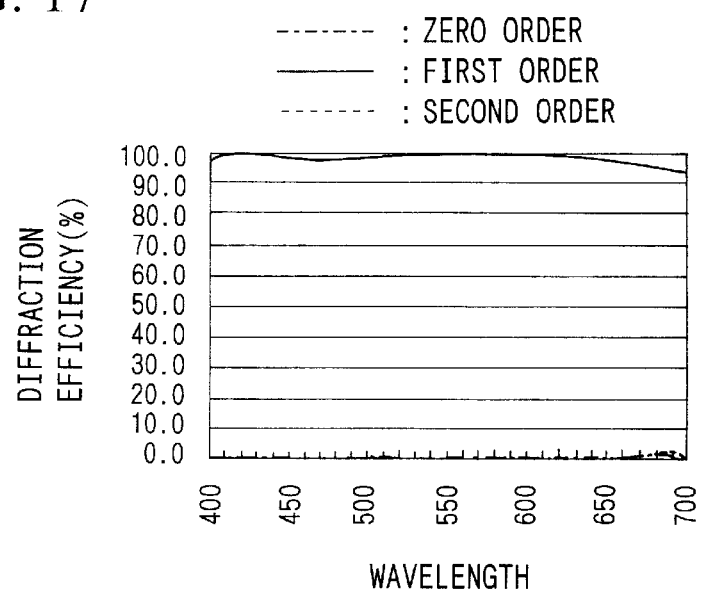
FIG. 17 is a graph for explaining the wavelength-dependent characteristic of the diffractive optical element shown in FIG. 16.

When the laminated type of diffractive optical element composed of two diffraction gratings 104 and 105 shown in FIG. 16 is used, the wavelength-dependent characteristic of the diffraction efficiency for the first-order diffracted rays is shown in FIG. 17.

In FIG. 16, a first diffraction grating 104 made of an ultraviolet setting resin (Nd=1.499, vd=54) is formed on a substrate 102. Then, a second diffraction grating 105 made of another ultraviolet setting resin (Nd=1.598, vd=28) is formed on the first diffraction grating 104. In this combination of materials, the thickness "d1" of the first diffraction grating 104 is taken at d1=13.8 μm, and the thickness "d2" of the second diffraction grating 105 is taken at d2=10.5 μm.

As is understandable from FIG. 17, the making of the diffractive optical element in the laminated structure increases the diffraction efficiency for the design order to higher than 95% over the entire range of useful wavelengths.

Figure 18:
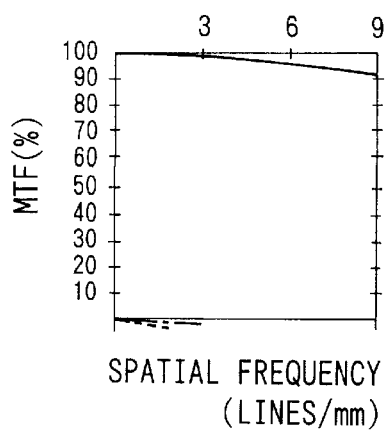
FIG. 18 is a graph of the MTF characteristics of the zoom lens of the numerical example 1 using the diffractive optical element shown in FIG. 16.

FIG. 18 shows the spatial-frequency-response MTF characteristics of the zoom lens of the numerical example 1 with the diffractive optical element in the grating form shown in FIG. 16. By using the diffractive optical element of the laminated structure, the MTF characteristic is improved in the low frequency region. The desired MTF characteristic is thus obtained. It will be appreciated from the foregoing that, if, as the diffractive optical element according to the invention, the laminated structure is used, further improvements of the optical performance can be achieved.

Figure 19:
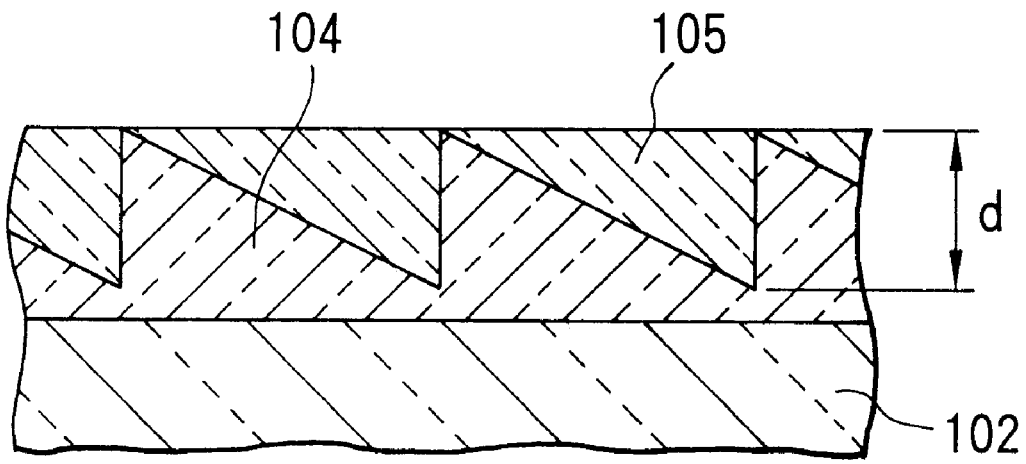
FIG. 19 is a sectional view of a diffractive optical element of another laminated type in which the two diffraction gratings are equal in grating thickness to each other.

It should be noted that, for the diffractive optical element of the laminated structure described above, the materials are not limited to the ultraviolet setting resin. Other materials such as plastics also may be used instead. For certain substrates, the first diffraction grating 104 may be formed directly therein. Furthermore, there is no need to differentiate the thicknesses of the two gratings from each other. In some combinations of materials, the thicknesses of the two gratings 104 and 105 may be made equal to each other as shown in FIG. 19.

Since, in this case, no grooves are exposed to the outside from the surface of the diffractive optical element, the dust proof is excellent, contributing to an increase of the productivity on the assembling line in manufacturing the diffractive optical elements.

Next, numerical data for the numerical examples 1 to 3 are shown in tables below, where Ri is the radius of curvature of the i-th lens surface, when counted from the object side, Di is the i-th axial lens thickness or air separation, when counted from the object side, and Ni and vi are respectively the refractive index and Abbe number of the glass of the i-th lens element, when counted from the object side. Also, the values of the factors in the above-described conditions (1) to (4) for the numerical examples 1 to 3 are listed in Table-1.

The shape of an aspheric surface is expressed in the coordinates with an X axis in the axial direction and a Y axis in a direction perpendicular to the optical axis, the direction in which light advances being taken as positive, by the following equation:

$$X = \frac{(1/R)Y^2}{1 + \sqrt{1 - (1+K)(Y/R)^2}} + BY^4 + CY^6 + DY^8 + EY^{10} + FY^{12}$$

where R is the radius of the osculating sphere, and K, B, C, D, E and F are the aspheric coefficients. Also, the notation "e-0X" means "$10^{-X}$".

Numerical Example 1

| f = 28.91 ~ 111.95 | Fno = 5.75 ~ 9.7 | 2ω = 73.6 ~ 21.9 | |
|---|---|---|---|
| R1 = 61.538 | D1 = 1.20 | N1 = 1.721506 | v1 = 29.2 |
| R2 = 35.290 | D2 = 0.50 | | |
| R3 = 12.675 | D3 = 3.30 | N2 = 1.503779 | v2 = 66.8 |
| R4 = 37.287 | D4 = Variable | | |
| R5 = Stop | D5 = 2.14 | | |
| R6 = −8.441 | D6 = 1.00 | N3 = 1.743197 | v3 = 49.3 |
| R7 = −13.638 | D7 = 0.50 | | |
| R8 = 186.232 | D8 = 3.13 | N4 = 1.583126 | v4 = 59.4 |
| R9 = −10.221 | D9 = Variable | | |
| R10 = −13.234 | D10 = 2.00 | N5 = 1.568728 | v5 = 63.2 |
| R11 = 153.574 | | | |

| Variable Separation | Focal Length | | |
|---|---|---|---|
| | 28.91 | 70.00 | 111.95 |
| D4 | 2.35 | 10.66 | 13.65 |
| D9 | 13.31 | 4.02 | 1.00 |

Aspheric Coefficients:

| R1: | K = 0 | A = 0 | B = −6.871e-06 | C = −3.769e-08 |
|---|---|---|---|---|
| | D = 5.046e-10 | E = −3.552e-12 | | |
| R9: | K = 0 | A = 0 | B = 1.140e-04 | C = 9.259e-07 |
| | D = −2.750e-08 | E = 5.520e-10 | | |
| R11: | K = 0 | A = 0 | B = −5.609e-05 | C = 3.163e-07 |
| | D = −1.264e-09 | E = 1.930e-12 | | |

-continued

Phase Coefficients:

R6: C2 = −1.20630e-03  C4 = 9.34880e-06  C6 = −2.84960e-07
R10: C2 = 1.29480e-03  C4 = −1.49190e-05  C6 = 7.63570e-08

Numerical Example 2 f = 38.92 ~ 125.94   Fno = 5.75 ~ 8.00   2ω = 58.1 ~ 19.5
R1 = 72.122    D1 = 1.20       N1 = 1.901354   ν1 = 31.6
R2 = 39.271    D2 = 0.50
R3 = 13.476    D3 = 4.75       N2 = 1.487489   ν2 = 70.2
R4 = 75.872    D4 = Variable
R5 = Stop      D5 = 3.76
R6 = −8.441    D6 = 1.00       N3 = 1.754998   ν3 = 52.3
R7 = −12.549   D7 = 0.50
R8 = −63.218   D8 = 2.87       N4 = 1.583126   ν4 = 59.4
R9 = −10.468   D9 = Variable
R10 = −13.234  D10 = 2.00      N5 = 1.522493   ν5 = 59.8
R11 = 429.825

|  | Variable Separation | Focal Length | | |
|---|---|---|---|---|
|  |  | 38.92 | 80.04 | 125.94 |
| D4 |  | 1.65 | 8.29 | 11.22 |
| D9 |  | 13.54 | 4.67 | 1.00 |

Aspheric Coefficients:

R1:   K = 0   A = 0   B = −5.149e-06   C = −5.861e-08
      D = 1.156e-09   E = −1.044e-11
R9:   K = 0   A = 0   B = 7.123e-05    C = 1.339e-06
      D = −5.465e-08  E = 1.235e-09
R11:  K = 0   A = 0   B = −4.342e-05   C = 1.892e-07
      D = −1.067e-09  E = 2.132e-12

Phase Coefficients:

R6:  C2 = −1.03030e-03  C4 = 1.07690e-05   C6 = −4.16160e-07
R10: C2 = 1.21780e-03   C4 = −9.19150e-06  C6 = 4.83000e-08

Numerical Example 3 f = 38.94 ~ 111.48   Fno = 5.75 ~ 9.7   2ω = 58.1 ~ 22.0
R1 = 56.337    D1 = 1.20       N1 = 1.688930   ν1 = 31.1
R2 = 30.703    D2 = 0.50
R3 = 13.646    D3 = 4.00       N2 = 1.518205   ν2 = 65.0
R4 = 45.065    D4 = Variable
R5 = Stop      D5 = 2.61
R6 = −9.756    D6 = 1.00       N3 = 1.721506   ν3 = 29.2
R7 = −14.475   D7 = 0.50
R8 = 18833.420 D8 = 3.99       N4 = 1.583126   ν4 = 59.4
R9 = −12.523   D9 = Variable
R10 = −13.234  D10 = 2.00      N5 = 1.487489   ν5 = 70.2
R11 = 549.527

|  | Variable Separation | Focal Length | | |
|---|---|---|---|---|
|  |  | 38.94 | 70.04 | 111.48 |
| D4 |  | 3.21 | 10.15 | 14.26 |
| D9 |  | 13.74 | 5.55 | 1.00 |

Aspheric Coefficients:

R1:   K = 0   A = 0   B = −7.935e-06   C = −2.966e-08
      D = 1.419e-10   E = −9.292e-14
R9:   K = 0   A = 0   B = 6.156e-05    C = 1.290e-06
      D = −7.837e-08  E = 1.767e-09
R11:  K = 0   A = 0   B = −5.510e-05   C = 2.850e-07
      D = −1.938e-09  E = 4.422e-12

Phase Coefficients:
R10: C2 = 6.35410e-04   C4 = −7.70360e-06   C6 = 3.07160e-08

TABLE 1

| Condition | Numerical Example | | |
|---|---|---|---|
|  | 1 | 2 | 3 |
| (1) C2 | $1.29 \times 10^{-3}$ | $1.22 \times 10^{-3}$ | $6.35 \times 10^{-4}$ |
| (2) C4 | $-1.49 \times 10^{-5}$ | $-9.19 \times 10^{-6}$ | $-7.70 \times 10^{-6}$ |
| (3) Fbo/fw | −13.36 | −10.55 | −20.21 |
| (4) C2_2*C2_3 | $-1.56 \times 10^{-6}$ | $-1.25 \times 10^{-6}$ | — |

As described above, the present embodiment (the numerical examples 1 to 3) makes up a zoom lens from three lens units in total. With this configuration, it sets forth appropriate rules of design for the form and the construction and arrangement of the constituent lenses in each lens unit and makes use of a diffractive optical element or elements of appropriate form or forms to correct well the variation of chromatic aberrations with zooming. It is, therefore, made possible to achieve a zoom lens having a field angle of 60 to 70 degrees or thereabout at the wide-angle end and a zoom ratio of about 3 to 4, which has a good optical performance throughout the entire zooming range, while still permitting the total length of the entire lens system to be shortened to a compact form.

(Second Embodiment)

Another embodiment of the invention is next described in which a zoom lens is made up from two lens units and takes an even more compact form.

FIG. 20 to FIG. 25 are lens block diagrams of six numerical examples 4 to 9 of zoom lenses in the wide-angle end. Their numerical data will be described later. The zoom lens comprises, in order from an object side, a first lens unit L1 of positive refractive power and a second lens unit L2 of negative refractive power. During zooming from the wide-angle end to the telephoto end, the first and second lens units L1 and L2 axially move toward the object side, while decreasing the separation therebetween. Incidentally, SP stands for a stop and IP stands for an image plane.

In the present embodiment, the use of such a zoom type has, despite the compact form, to correct chromatic aberrations well, thus making it possible to realize a high optical performance.

The second lens unit L2, when in the telephoto end, greatly enlarges the image magnifying power of the first lens unit L1. To extend the range of image magnifications as much desired, therefore, chromatic aberrations become difficult to correct. Also, to improve the compact form, the refractive power of each of the lens units L1 and L2 has to strengthen, causing an increase of the difficulty of correcting the chromatic aberrations. In order to correct the chromatic aberrations well throughout the entire zooming range, it becomes important to find out proper rules of design for the construction and arrangement of the constituent lenses of each lens unit L1, L2 and to effectively use the diffractive optical element or elements.

Figure 20:
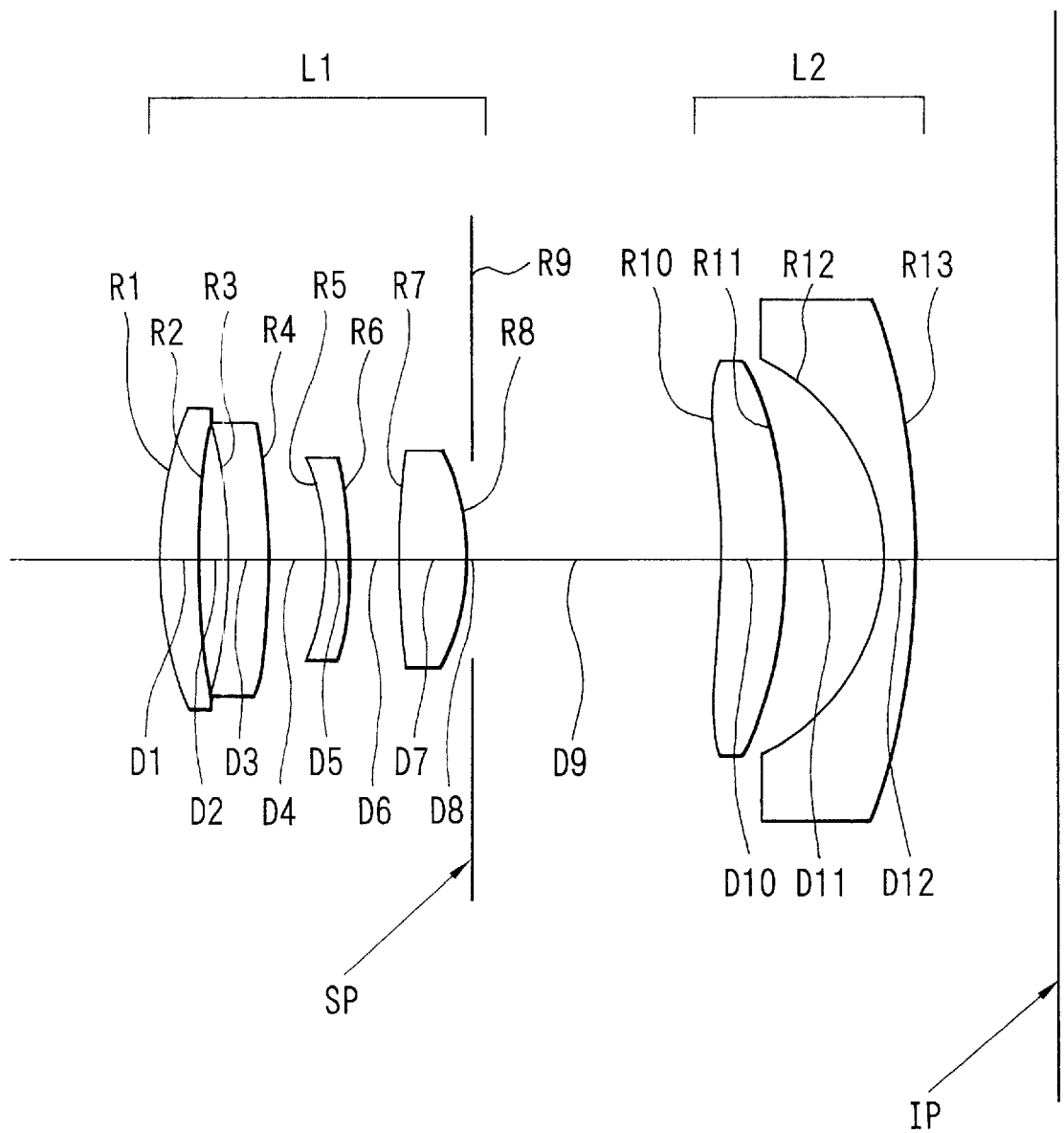
FIG. 20 is a longitudinal section view of a numerical example 4 of the zoom lens.

In the zoom lens of the numerical example 4 shown in FIG. 20, the first lens unit L1 is constructed with at least three lenses, concretely speaking, four lenses in a plus-minus-minus-plus refractive power arrangement in this order from the object side. At least one diffractive optical element is used in the entire lens system. The chromatic aberrations are thus made possible to correct well. In actual practice, the seventh and eleventh surfaces are selected to be made as diffractive optical surfaces.

In a case where the diffractive optical element is used in the first lens unit L1, the longitudinal chromatic aberration in particular can be corrected well. In another case where the diffractive optical element is used in the second lens unit L2, the lateral chromatic aberration in particular can be corrected well.

Figure 21:
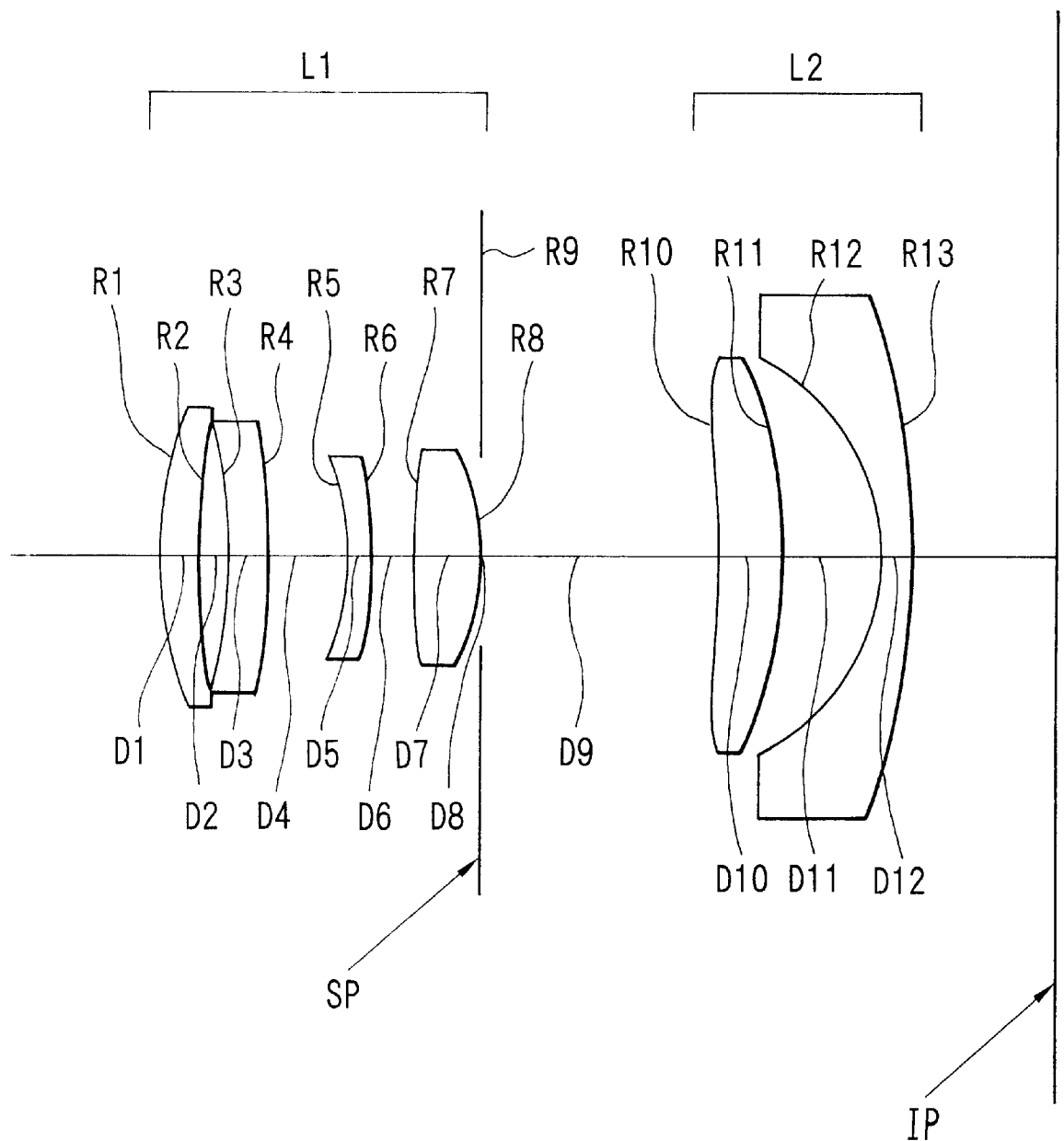
FIG. 21 is a longitudinal section view of a numerical example 5 of the zoom lens.

In the zoom lens of the numerical example 5 shown in FIG. 21, the first lens unit L1 is constructed with at least three lenses, concretely speaking, four lenses in a plus-minus-minus-plus refractive arrangement in this order from the object side. In addition, at least one diffractive optical element is used in each of the first and second lens units L1 and L2, thereby making it possible to correct chromatic aberrations well. To maintain good stability of correction of the longitudinal chromatic aberration throughout the entire zooming range, each lens unit L1, L2 must be corrected sufficiently in itself.

For the first lens unit L1, the diffractive optical element is so arranged as to correct the longitudinal chromatic aberration well in itself. With this arrangement, particularly during zooming, the variation with zooming of longitudinal chromatic aberrations is suppressed to a minimum. For the second lens unit L2, since the off-axial light beam travels at a far side from the optical axis, the diffractive optical element used therein can correct the lateral chromatic aberration in particular. In actual practice, the eighth and thirteenth surfaces are selected to be made as diffractive optical surfaces.

Figure 22:
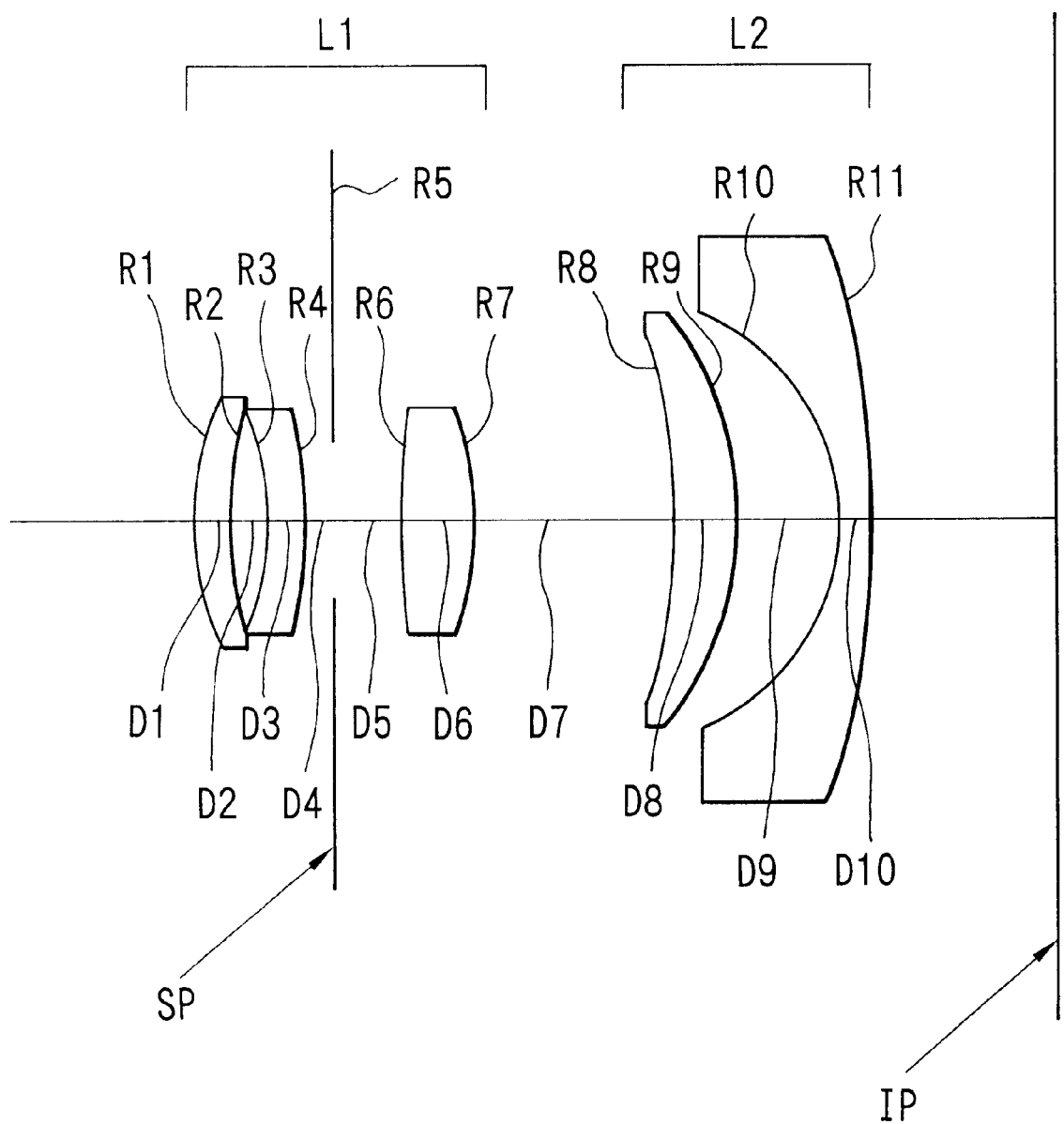
FIG. 22 is a longitudinal section view of a numerical example 6 of the zoom lens.

In the zoom lens of the numerical example 6 shown in FIG. 22, the first lens unit L1 has at least a positive lens and a negative lens, concretely speaking, three lenses in a plus-minus-plus refractive power arrangement in this order from the object side. In the first lens unit L1, there is used at least one diffractive optical element. In actual practice, the seventh and eleventh surfaces are made as diffractive optical surfaces.

The second lens unit L2 has a negative lens. Longitudinal chromatic aberration can be corrected by using a glass material of high or low dispersion in this negative lens, or by using the diffractive optical element to impart a similar effect thereto. However, lateral chromatic aberration in particular tends to be difficult to correct. Nonetheless, a positive lens disposed at the position closest to the object side can be used in correcting the longitudinal and lateral chromatic aberrations in good balance.

Such a framework of the first lens unit L1 having at least a positive lens and a negative lens deserves an even higher optical performance. To this purpose, letting the focal length of the first lens unit L1 be denoted by f1 and the focal length, the refractive index and the Abbe number of the material of the positive lens closest to the object side in the first lens unit L1 be denoted by fG1, ndG1 and vdG1, respectively, it is preferable to satisfy the following conditions:

$0 < f1/fG1 < 0.8$ (5)

$1.48 < ndG1 < 1.70$ (6)

$30 < vdG1 < 65$ (7)

The inequalities of condition (5) are concerned with the focal length of the positive lens closest to the object side in the first lens unit L1 and the focal length of the first lens unit L1 and have an aim to correct various aberrations. When the lower limit of the condition (5) is exceeded, the refractive power of the first lens unit L1 becomes negative and the above-described effects cannot be obtained. So, this violation is objectionable. When the upper limit is exceeded, as this means that the refractive power of the first lens unit L1 is too strong, particularly for the wide-angle end, distortion deteriorates objectionably. For more desired results, it is preferred to alter the lower limit of the condition (5) to "0.1" and the upper limit to "0.7".

The inequalities of condition (6) give a range for the refractive index of the material of the positive lens closest to the object side in the first lens unit L1. When the lower limit of the condition (6) is exceeded, the required curvatures for the appropriately determined refractive power of the surfaces of this lens tend to become tough. So, comatic aberration deteriorates objectionably. When the upper limit is exceeded, the Petzval sum increases in the negative sense, deteriorating the focal surface characteristics objectionably. For more desired results, it is preferred to alter the lower limit of the condition (6) to "1.50" and the upper limit to "1.65".

The inequalities of condition (7) give a range for the Abbe number of the material of the positive lens closest to the object side in the first lens unit L1. When the lower limit of the condition (7) is exceeded, as this means that the dispersion is too large, the difficulty of correcting the longitudinal chromatic aberration increases objectionably. When the upper limit is exceeded, as this means that the dispersion is too small, it becomes difficult to correct the lateral chromatic aberration well over the entire zooming range. So, this violation is objectionable. For more desired results, it is preferred to alter the lower limit of the condition (7) to "35" and the upper limit to "60".

Figure 23:
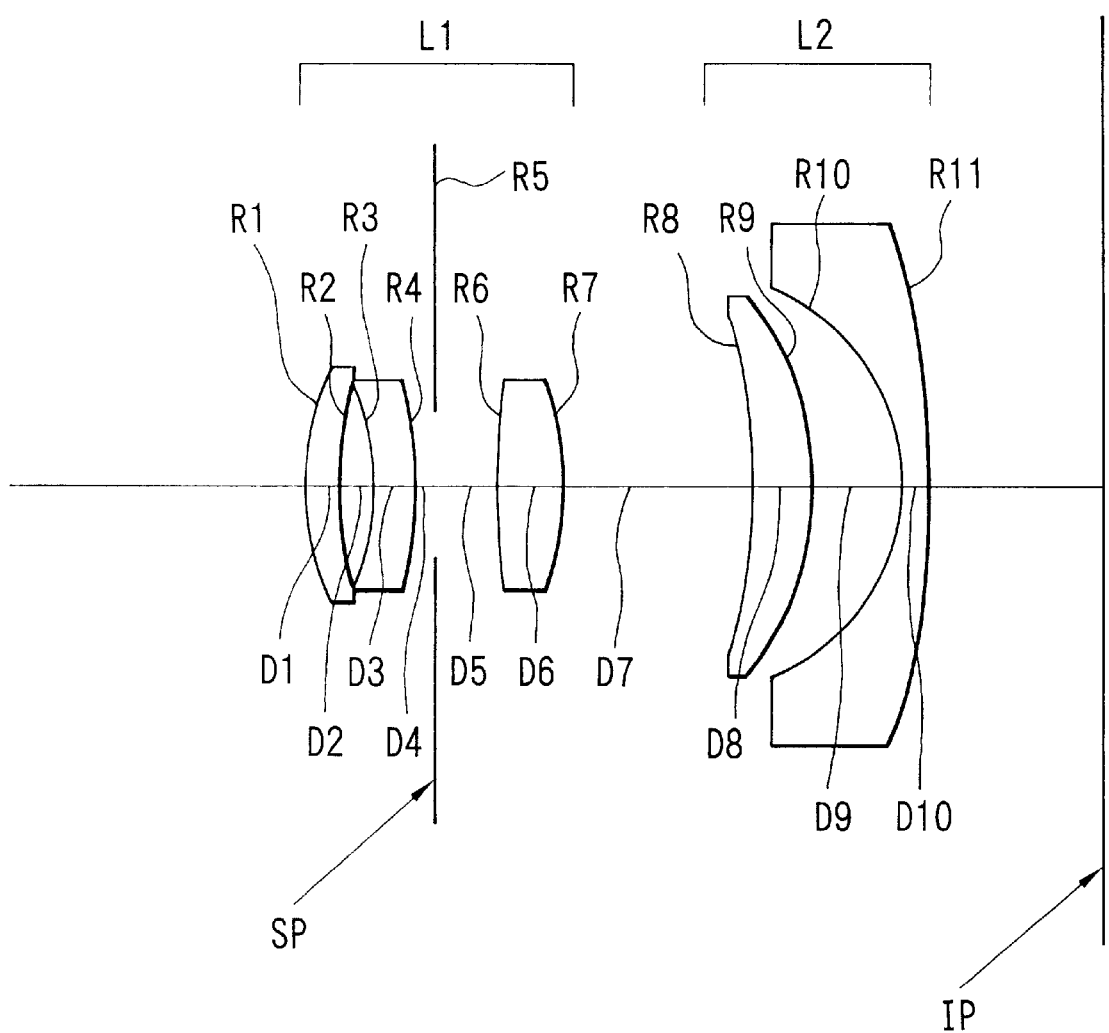
FIG. 23 is a longitudinal section view of a numerical example 7 of the zoom lens.

In the zoom lens of the numerical example 7 shown in FIG. 23, the first lens unit L1 has at least two positive lenses and at least one negative lens, concretely speaking, three lenses in a plus-minus-plus refractive power arrangement in this order from the object side. In the entire lens system, there is used at least one diffractive optical element. In actual practice, the sixth and eighth surfaces are made as diffractive optical surfaces.

To assure improvements of the compact form, there is need to strengthen the refractive power of each of the lens units L1 and L2. In this case, however, the optical performance is hardly retained good. Particularly, the spherical aberration and field curvature the first lens unit L1 produces become difficult to correct. So, the first lens unit L1 is constructed with inclusion of at least two positive lenses over which the positive refractive power is distributed. Good correction of spherical aberration is thus made easier. At the same time, the field curvature is corrected. Also, the air separation created between the two positive lenses is usable to correct distortion particularly for the wide-angle end.

To attain a high optical performance, likewise as in the numerical example 7, it is desirable to construct the first lens unit L1 in the form of a triplet comprising, in order from the object side, a positive lens, a negative lens and a positive lens.

Further, to correct chromatic aberrations well, it is desirable that, of the positive lenses in the first lens unit L1, the one which is located closest to the image side and has a strongest positive refractive power in the first lens unit L1 is selected for application of a diffractive optical surface. As the first lens unit L1 is positive in power, longitudinal chromatic aberration originates in large part from that positive lens. By providing that positive lens with the diffractive optical element having a negative dispersion, therefore, the chromatic aberrations the first lens unit L1 produces can be corrected advantageously.

Figure 24:
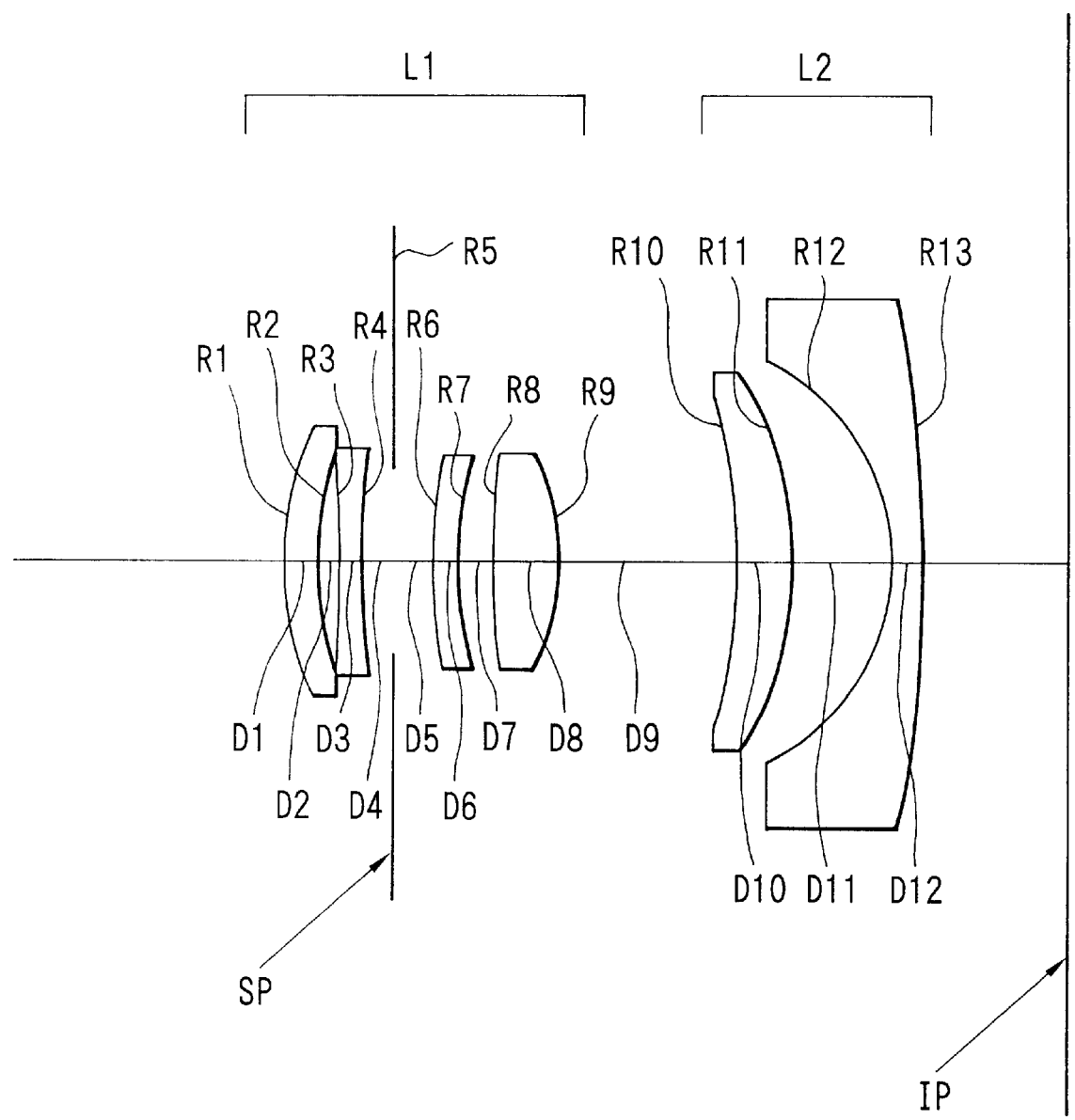
FIG. 24 is a longitudinal section view of a numerical example 8 of the zoom lens.

In the zoom lens of the numerical example 8 shown in FIG. 24, the first lens unit L1 has at least one positive lens and at least two negative lenses, concretely speaking, four lenses in a plus-minus-minus-plus refractive power arrangement. The optical system as a whole makes use of at least one diffractive optical element. In actual practice, the ninth and thirteenth surfaces are made as diffractive optical surfaces.

To assure improvements of the compact form, there is need to strengthen the refractive power of each of the lens units L1 and L2. However, because of this, the high optical performance is difficult to preserve. Particularly, the spherical aberration the first lens unit L1 produces becomes difficult to correct. So, the first lens unit L1 is constructed with inclusion of at least two negative lenses over which the negative refractive power is distributed. The one of the negative lenses which lies relatively closer to the object side can be used to correct the spherical aberration in particular.

Further, to attain a high optical performance, it is desirable that, as in the numerical example 8, the first lens unit L1 comprises, in order from the object side, a positive lens, a negative lens, a negative lens and a positive lens.

Alternatively, to correct spherical aberrations well, it is desirable to make use of at least one aspheric surface in the negative lens in the first lens unit L1. Since the spherical aberration the first lens unit L1 produces becomes undercorrected, the aspheric surface to be used in the negative lens is desirably formed to such a shape that the negative refractive power becomes progressively stronger toward the margin.

Figure 25:
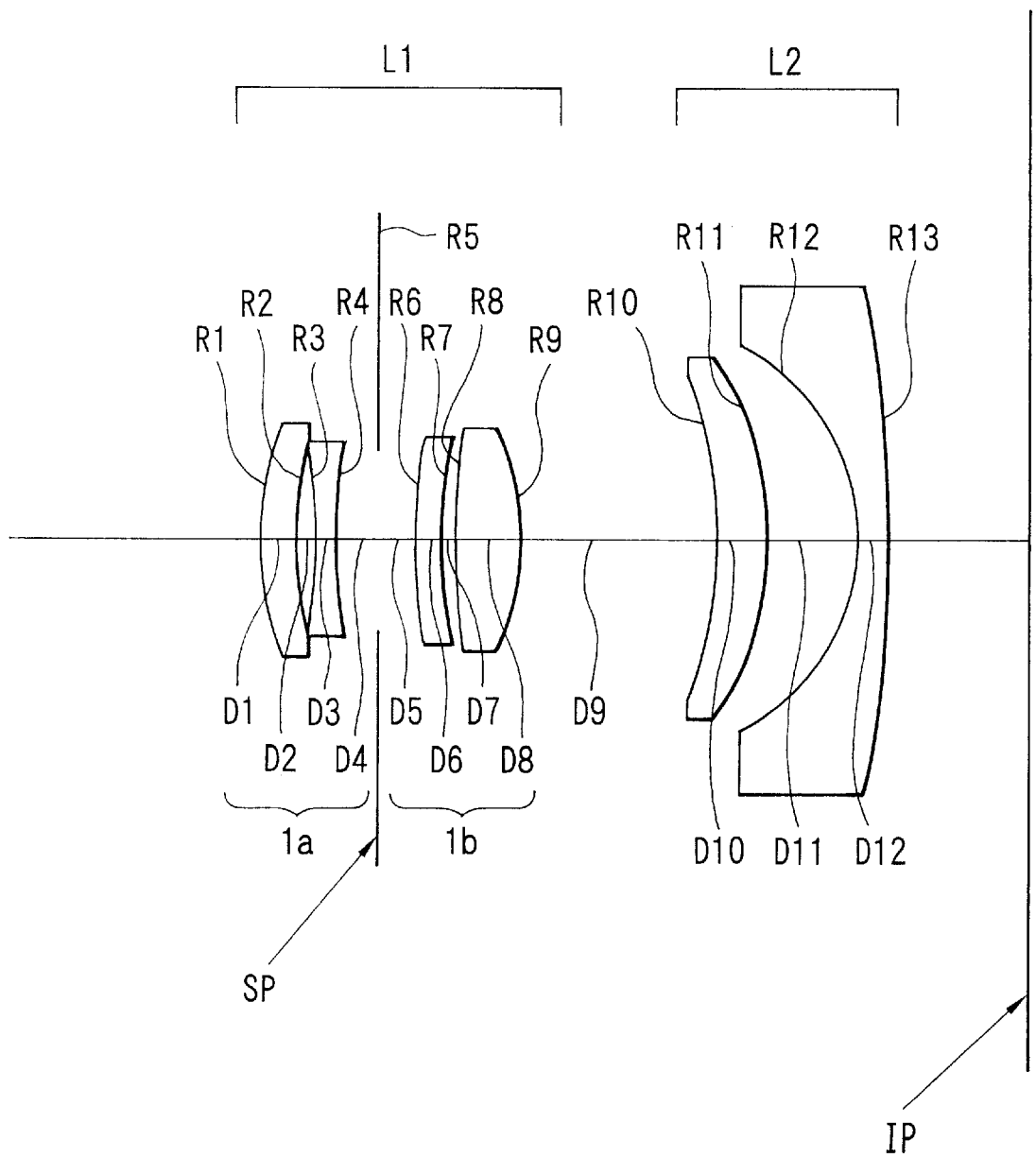
FIG. 25 is a longitudinal section view of a numerical example 9 of the zoom lens.

In the numerical example 9 shown in FIG. 25, the stop SP is positioned within the first lens unit L1. When the first lens unit L1 is divided into a front lens sub-unit 1a disposed closer to the object side than the stop SP and a rear lens sub-unit 1b disposed closer to the image side than the stop SP, the rear lens sub-unit 1b is provided with at least one diffractive optical element. Concretely speaking, the ninth and thirteenth surfaces are made as diffractive optical surfaces.

This zoom type makes the shortest distance from the first lens unit L1 to the final plane in the telephoto end. The positioning of the stop SP within the first lens unit L1 allows the second lens unit L2 to approach the first lens unit L1 more closely. In turn, the refractive power of the second lens unit L2 can be made relatively weak to thereby produce an advantage on the aberrational problem.

Further, to attain a high optical performance, letting the focal lengths of the front and rear lens sub-units 1a and 1b be denoted by f(1a) and f(1b), respectively, it is preferable to satisfy the following condition:

$$f(1b)/f(1a)<0.4 \tag{8}$$

When the upper limit of the condition (8) is exceeded, the refractive power of the front lens sub-unit 1a becomes too much stronger than that of the rear lens sub-unit 1b. This is objectionable. Also, if the power of the front lens sub-unit 1a increases in the negative sense, the diameter of the first lens unit L1 in particular increases objectionably. If the power of the front lens sub-unit 1a increases in the positive sense, the difficulty of correcting distortion particularly for the wide-angle end increases objectionably. Further, to attain a high optical performance, it is desirable to alter the upper limit of the condition (8) to "0.2".

Furthermore, in all of the numerical examples 4 to 9, it is preferred to satisfy at least one of the following features or conditions.

(a) The second lens unit L2 has a positive lens and a negative lens in this order from the object side. This arrangement is favorable for making it possible to correct distortion particularly for the wide-angle end. With the negative lens alone, particularly for the wide-angle end, the second lens unit L2 produces too large distortion. So, there are some cases where the first lens unit L1 cannot correct such distortion.

To attain more improved results, it is preferred to apply an aspheric surface to at least one surface in the second lens unit L2. As this aspheric surface is formed to a shape that the positive refractive power becomes progressively stronger toward the margin, particularly for the wide-angle end, it becomes possible to correct coma and distortion.

(b) For the diffractive optical element in the first lens unit L1, as the phase $\phi(H)$ of the diffractive optical surface of the diffractive optical element is defined as $$\phi(h)=(2\pi/\lambda)\cdot(\Sigma Ci\cdot h^i)$$

where h is the height from the optical axis, $\lambda$ is the wavelength, and Ci is the phase coefficient in the term of the i-th degree, the following condition is satisfied:

$$-0.1<C2<0 \tag{9}$$

The inequalities of condition (9) give a range for the phase coefficient in the term of the second degree of the diffractive optical surface in the first lens unit L1 and have an aim chiefly to correct longitudinal chromatic aberration. When the lower limit of the condition (9) is exceeded, the longitudinal chromatic aberration the first lens unit L1 alone produces becomes over-corrected. The longitudinal chromatic aberration is, therefore, hardly maintained stable over the entire zooming range. So, the violation is objectionable. When the upper limit is exceeded, or when the coefficient has a positive value, as this means that the refractive power of the diffractive optical surface becomes negative, the first lens unit L1 of positive refractive power cannot correct longitudinal chromatic aberration in itself.

(c) For the diffractive optical element in the second lens unit L2, as the phase $\phi(H)$ of the diffractive optical surface of the diffractive optical element is defined as $$\phi(h)=(2\pi/\lambda)\cdot(\Sigma Ci\cdot h^i)$$

where h is the height from the optical axis, $\lambda$ is the wavelength, and Ci is the phase coefficient in the term of the i-th degree, the following condition is satisfied:

$$0<C2<0.1 \tag{10}$$

The inequalities of condition (10) give a range for the phase coefficient in the term of the second degree of the diffractive optical surface in the second lens unit L2 and have an aim chiefly to correct longitudinal chromatic aberration. When the lower limit of the condition (9) is exceeded, the longitudinal chromatic aberration the second lens unit L2 alone produces becomes over-corrected. The longitudinal chromatic aberration is, therefore, hardly maintained stable over the entire zooming range. So, the violation is objectionable. When the lower limit is exceeded, or when the coefficient has a negative value, as this means that the refractive power of the diffractive optical surface becomes positive, the second lens unit L2 of negative refractive power cannot correct longitudinal chromatic aberration in itself.

(d) Letting the focal lengths of the first and second lens units L1 and L2 be denoted by f1 and f2, respectively, and the focal length of the entire lens system in the wide-angle end be denoted by fw, the following conditions are satisfied:

$$0.4<f1/fw<0.9 \tag{11}$$

$$0.4<|f2/fw|<0.9 \tag{12}$$

The inequalities of conditions (11) and (12) give proper ranges for the refractive powers of both lens units L1 and L2 and have an aim to improve the compact form of the optical system in such a manner as to maintain the good optical performance. When the lower limit of the condition (11) is exceeded, as this means that the refractive power of the first lens unit L1 is too strong, distortion particularly for the wide-angle end and spherical aberration particularly for the telephoto end become difficult to correct. So, the violation is objectionable. When the upper limit is exceeded, as this means that the refractive power of the first lens unit L1 is too weak, the total length of the entire lens system increases objectionably. To take a better balance between the optical performance and the improvement of the compact form, it is desired to alter the lower limit of the condition (11) to "0.5" and the upper limit to "0.8".

When the lower limit of the condition (12) is exceeded, as this means that the refractive power of the second lens unit L2 is too strong, particularly for the wide-angle end, curvature of field and distortion become difficult to correct. When the upper limit is exceeded, as this means that the refractive power of the second lens unit L2 is too weak, the zooming movement of the second lens unit L2 increases largely, which, in turn, causes the total length for the telephoto end of the entire lens system to increase objectionably. Further, to take a better balance between the optical performance and the improvement of the compact form, it is desired to alter the lower limit of the condition (12) to "0.5" and the upper limit to "0.75".

(e) Each of the positive lens disposed closest to the image side in the first lens unit L1 and the negative lens disposed closest to the image side in the second lens unit L2 has at least a diffractive optical surface. The use of such a diffractive optical surface makes it possible to correct chromatic aberrations well.

The positive lens of strongest refractive power in the first lens unit L1 is rather better arranged at the position closest to the image side in the first lens unit L1, so that the rear principal point of the first lens unit L1 is put closer to the image side. In the telephoto end, therefore, the interval between the principal points of the first and second lens units L1 and L2 can be shortened. This produces an advantage of making it easier to determine the refractive power of each lens unit L1, L2. Since this positive lens is relatively strong in refractive power, the longitudinal chromatic aberration of the first lens unit L1 alone is caused to deteriorate. Although this longitudinal chromatic aberration can be corrected by making smaller the dispersion of the material of the positive lens, the availability of such a material was limited in the past. However, it is now preferred that the diffractive optical element having a negative dispersion is applied to this positive lens with an advantage of effectively correcting the chromatic aberrations of the first lens unit L1. Also, the negative lens disposed closest to the image side in the second lens unit L2 has the off-axial light beam travelling a far point from the optical axis. It is recommended to apply the diffractive optical element to this negative lens, so that lateral and longitudinal chromatic aberrations can be corrected at once.

(f) The grating in the diffractive optical surface is formed to an optical system of the laminated type.

For the optical system using the diffractive optical element, to realize achievement of a high optical performance, it is preferred that the groove form of the diffractive optical element is made to be a diffraction grating of the laminated structure.

The diffraction grating of the diffractive optical element has a kinoform shown in FIG. 13. FIG. 14 shows the wavelength-dependent characteristics of the diffraction efficiency for the first-order diffracted rays of the diffractive optical element of FIG. 13. The actual diffractive optical element is constructed with a layer of ultra-violet ray setting resin on the surface of the substrate 102 described before in which a diffraction grating 103 is formed to such a thickness "d" that the diffraction efficiency of the first-order diffracted rays becomes 100% at a wavelength of 530 $\mu$m.

Figure 26A:
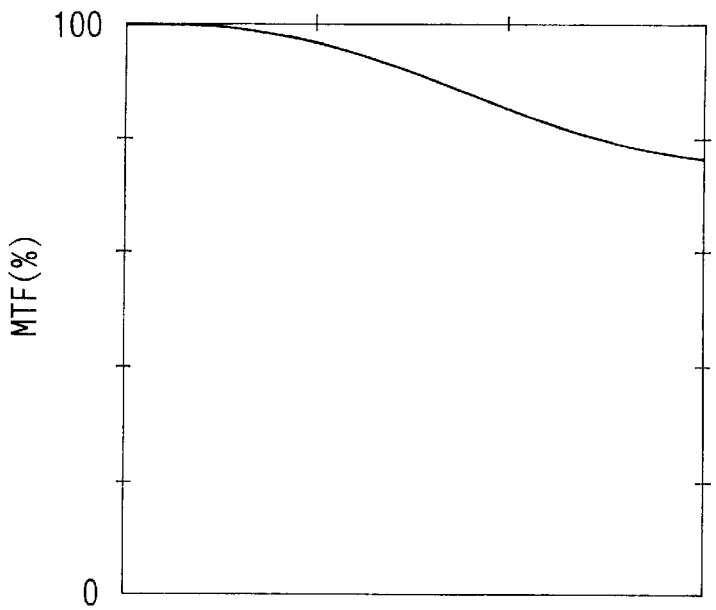
FIGS. 26A and 26B are graphs of the MTF characteristic of the zoom lens of the numerical example 4 using the diffractive optical element shown in FIG. 13.
Figure 26B:
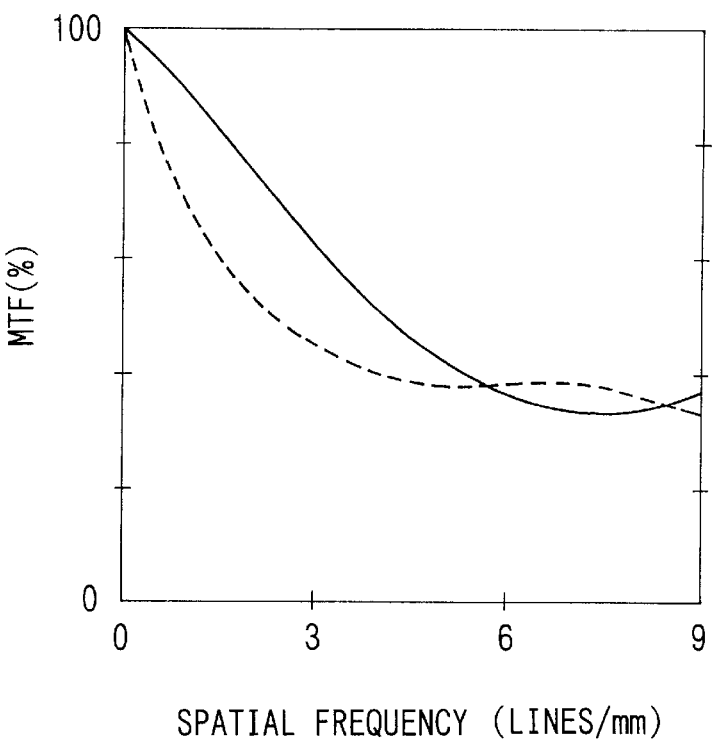

FIGS. 26A and 26B show the MTF characteristics relative to the spatial frequency of the zoom lens of the numerical example 4 using the diffraction optical element in the form of the grating shown in FIG. 13. It is understandable that the MTF of the low frequency region slightly drops from the desired value.

Figure 27A:
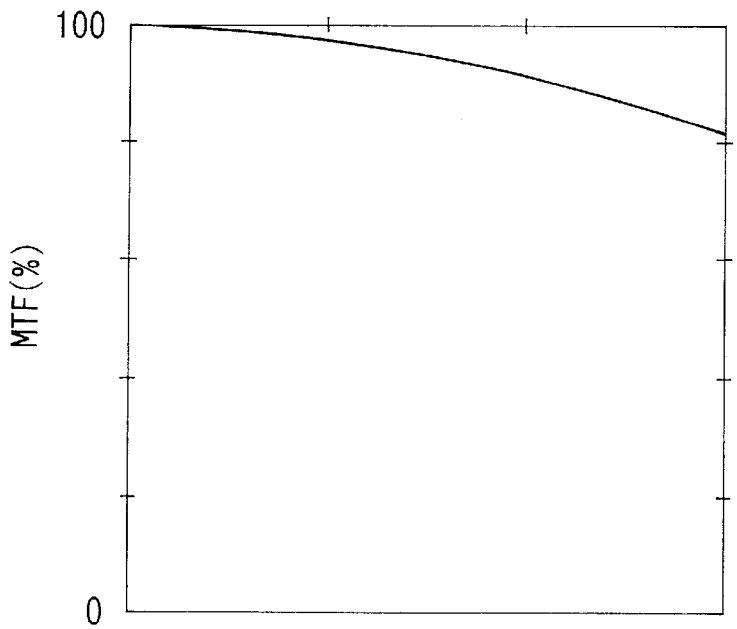
FIGS. 27A and 27B are graphs of the MTF characteristic of the zoom lens of the numerical example 4 using the diffractive optical element shown in FIG. 16.
Figure 27B:
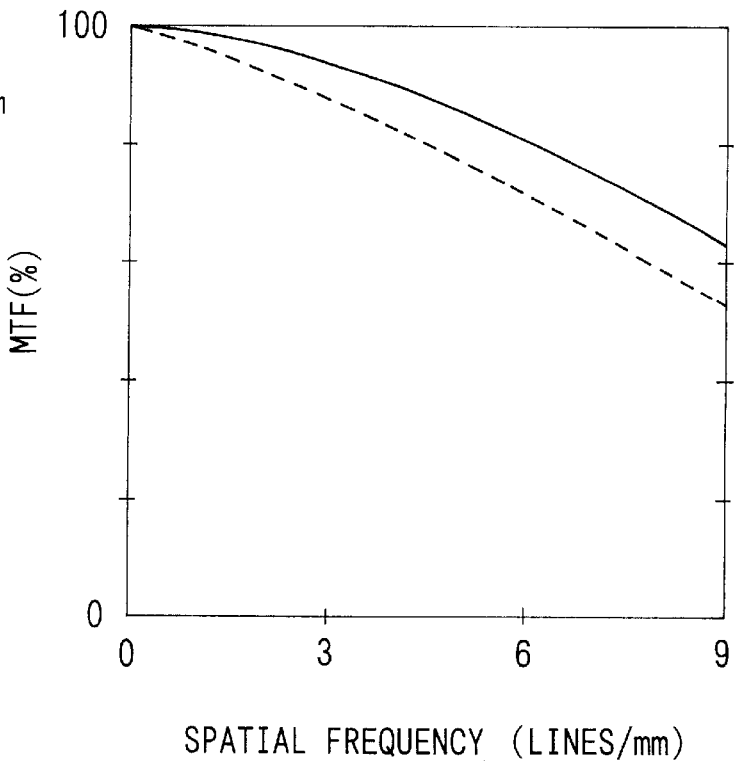
Figures 36A, 36B, 36C, 36D:
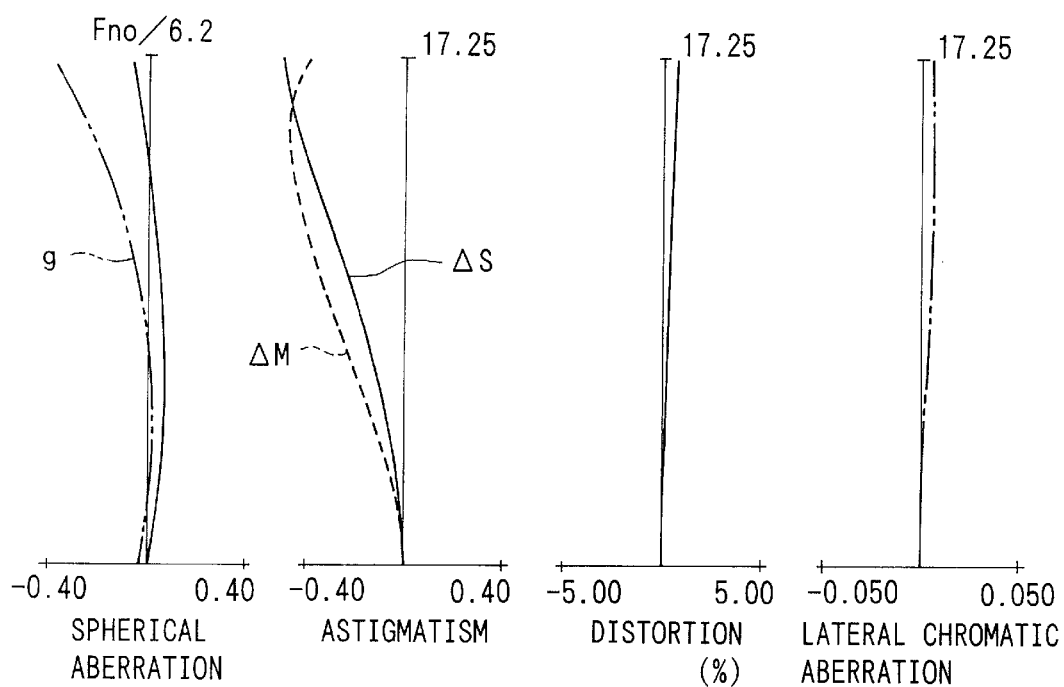
FIGS. 36A, 36B, 36C and 36D are graphic representations of the aberrations of the zoom lens of the numerical example 6 in the telephoto end.
Figures 37A, 37B, 37C, 37D:
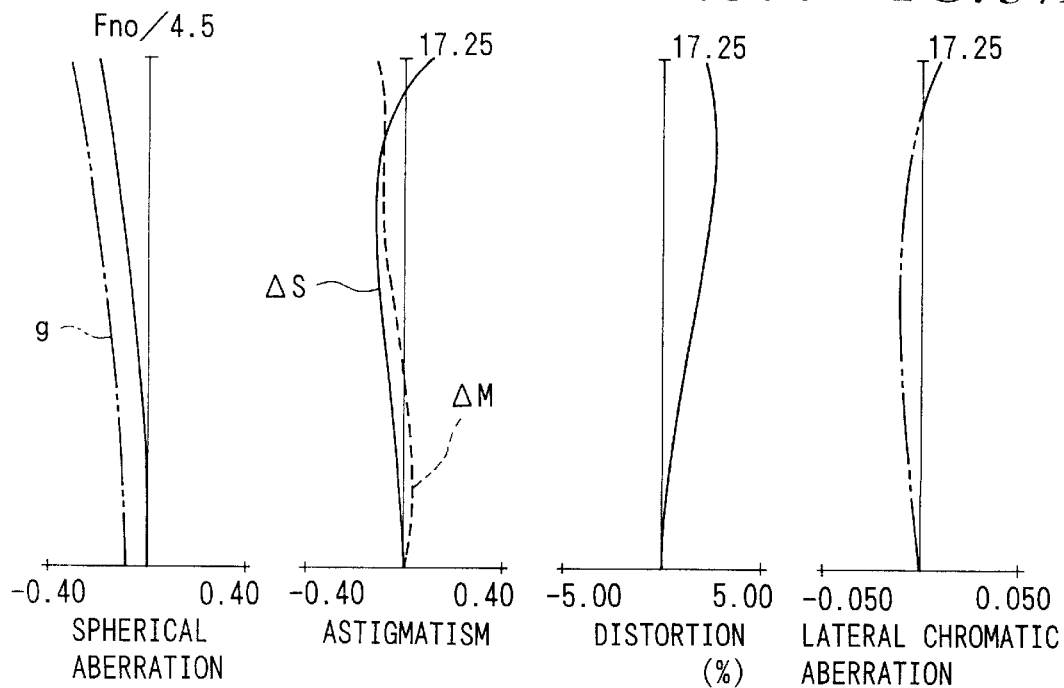
FIGS. 37A, 37B, 37C and 37D are graphic representations of the aberrations of the zoom lens of the numerical example 7 in the wide-angle end.
Figures 42A, 42B, 42C, 42D:
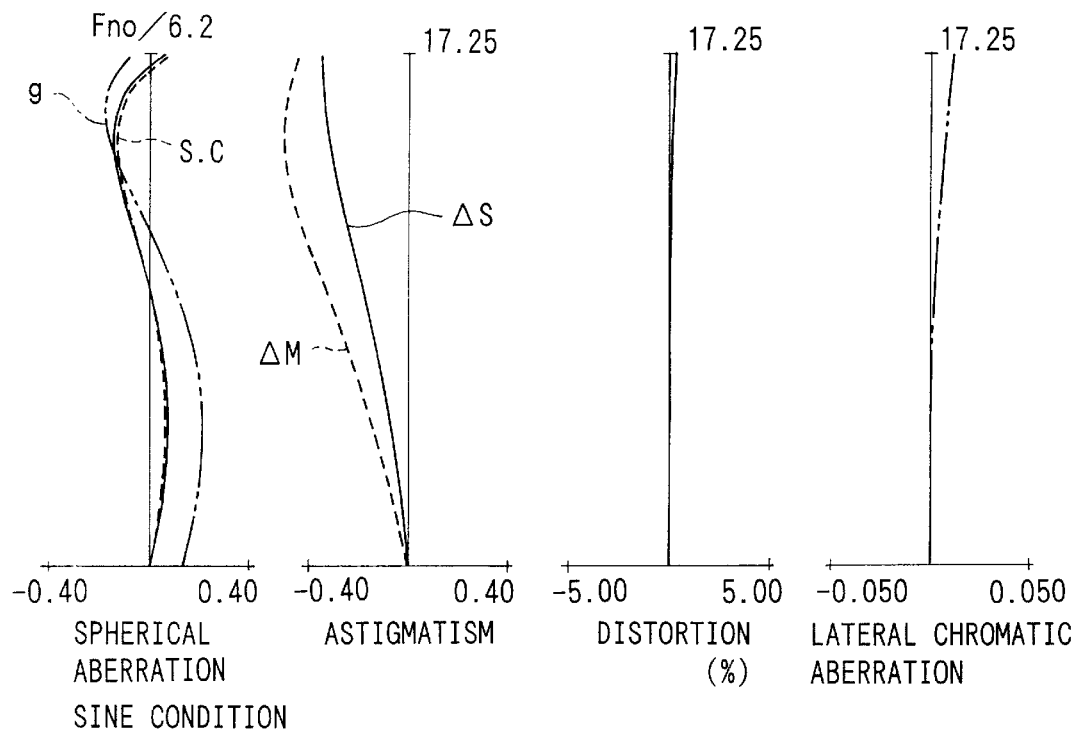
FIGS. 42A, 42B, 42C and 42D are graphic representations of the aberrations of the zoom lens of the numerical example 8 in the telephoto end.
Figures 43A, 43B, 43C, 43D:
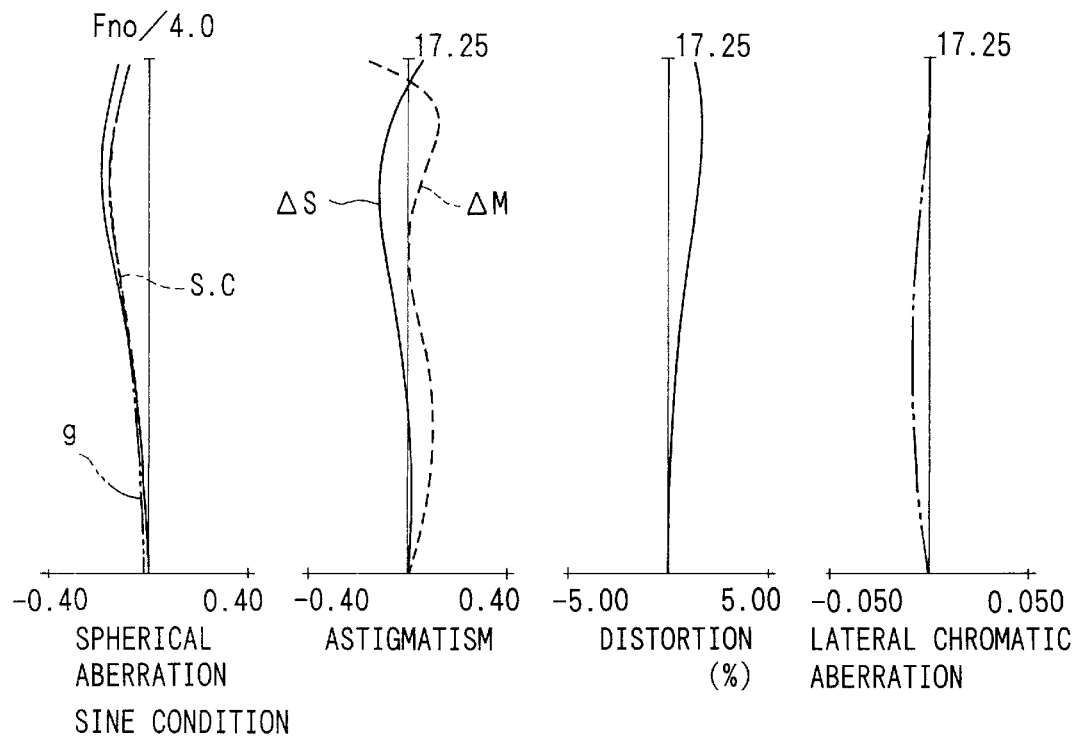
FIGS. 43A, 43B, 43C and 43D are graphic representations of the aberrations of the zoom lens of the numerical example 9 in the wide-angle end.

FIGS. 27A and 27B show the MTF characteristics relative to the spatial frequency of the zoom lens of the numerical example 4 using the diffraction optical element in the form of the grating shown in FIG. 16. By using the laminated type of diffraction grating, the optical performance can be further improved. Incidentally, the laminated type of diffraction grating shown in FIG. 19 may be also used.

Next, numerical data for the six numerical examples 4 to 9 are shown in tables, where Ri is the radius of curvature of the i-th lens surface, when counted from the object side, Di is the i-th axial lens thickness or air separation, when counted from the object side, and Ni and vi are respectively the refractive index and Abbe number of the glass of the i-th lens element, when counted from the object side.

The shape of an aspheric surface is expressed in the coordinates with an X axis in the axial direction and a Y axis in a direction perpendicular to the optical axis, the direction in which light advances being taken as positive, by the following equation:

$$X = \frac{(1/R)Y^2}{1+\sqrt{1-(Y/R)^2}} + AY^2 + BY^4 + CY^6 + DY^8 + EY^{10} + FY^{12} + GY^{14}$$

where R is the radius of the osculating sphere, and A, B, C, D, E, F and G are the aspheric coefficients.

The shape of the diffractive optical surface is expressed by the following equation for the phase $\phi(h)$:

$$\phi(h)=(2\pi/\lambda)\cdot(C2\cdot h^2+C4\cdot h^4+C6\cdot h^6+C8\cdot h^8)$$

where h is the height from the optical axis, $\lambda$ is the wavelength, and Ci is the phase coefficient in the term of the i-th degree.

Numerical Example 4

| f = 28.8 ~ 81.6 | Fno = 3.8 ~ 10.8 | 2ω = 61.9 ~ 23.9 | |
|---|---|---|---|
| R1 = 16.531 | D1 = 1.56 | N1 = 1.517417 | v1 = 52.4 |
| R2 = 38.386 | D2 = 1.02 | | |
| R3 = −23.795 | D3 = 1.44 | N2 = 1.834000 | v2 = 37.2 |
| R4 = −66.900 | D4 = 2.10 | | |
| *R5 = −24.802 | D5 = 1.20 | N3 = 1.583060 | v3 = 30.2 |
| R6 = −35.241 | D6 = 2.35 | | |
| *R7 = 41.325 | D7 = 2.56 | N4 = 1.487490 | v4 = 70.2 |
| R8 = −11.265 | D8 = 0.72 | | |
| R9 = Stop | D9 = Variable | | |
| *R10 = −45.826 | D10 = 2.24 | N5 = 1.491710 | v5 = 57.4 |
| *R11 = −22.018 | D11 = 4.22 | | |
| R12 = −8.722 | D12 = 1.08 | N6 = 1.772499 | v6 = 49.6 |
| R13 = −36.477 | | | |

| Variable Separation | Focal Length | | |
|---|---|---|---|
| | 28.80 | 49.48 | 81.60 |
| D9 | 9.52 | 4.10 | 1.12 |

-continued

Aspheric Coefficients:

| R5: | A = 0.00000·10⁰ | B = −1.34789·10⁻⁴ | C = −1.58360·10⁻⁶ |
| --- | --- | --- | --- |
|  | D = −1.78761·10⁻⁸ | E = 1.10032·10⁻⁹ | F = −6.72520·10⁻¹² |
| R7: | A = 0 | B = −2.85904·10⁻⁵ | C = −1.95252·10⁻⁷ |
|  | D = −1.66452·10⁻⁸ |  |  |
| R10: | A = 0.00000·10⁰ | B = 6.86886·10⁻⁵ | C = 1.20454·10⁻⁶ |
|  | D = 5.42222·10⁻⁸ | E = −1.17587·10⁻⁹ | F = 9.44691·10⁻¹² |
| R11: | A = 0 | B = 2.80650·10⁻⁶ | C = −1.85905·10⁻⁷ |
|  | D = 1.34134·10⁻⁹ |  |  |

Phase Coefficients:

| R7: | C2 = −9.57314·10⁻⁴ | C4 = 8.95657·10⁻⁶ | C6 = 1.03754·10⁻⁷ |
| --- | --- | --- | --- |
| R11: | C2 = 1.51659·10⁻³ | C4 = −2.8692·10⁻⁵ | C6 = 3.77816·10⁻⁷ |

Numerical Example 5

| f = 28.8 ~ 81.6 | Fno = 3.5 ~ 9.9 | 2ω = 61.8 ~ 23.9 |
| --- | --- | --- |
| R1 = 16.236 | D1 = 1.68 | N1 = 1.517417 | v1 = 52.4 |
| R2 = 35.596 | D2 = 1.02 |  |  |
| R3 = −23.855 | D3 = 1.60 | N2 = 1.834000 | v2 = 37.2 |
| R4 = −47.753 | D4 = 3.20 |  |  |
| *R5 = −23.700 | D5 = 1.20 | N3 = 1.743997 | v3 = 44.8 |
| R6 = −37.169 | D6 = 1.52 |  |  |
| R7 = 42.526 | D7 = 2.80 | N4 = 1.487490 | v4 = 70.2 |
| *R8 = −11.012 | D8 = 0.00 |  |  |
| R9 = Stop | D9 = Variable |  |  |
| *R10 = −73.628 | D10 = 2.08 | N5 = 1.730770 | v5 = 40.6 |
| R11 = −30.863 | D11 = 4.11 |  |  |
| R12 = −8.921 | D12 = 1.08 | N6 = 1.772499 | v6 = 49.6 |
| *R13 = −46.845 |  |  |  |

| Variable Separation | Focal Length | | |
| --- | --- | --- | --- |
|  | 28.81 | 49.46 | 81.59 |
| D9 | 9.43 | 3.99 | 1.00 |

Aspheric Coefficients:

| R5: | A = 0.00000·10⁰ | B = −1.55663·10⁻⁴ | C = −1.36097·10⁻⁶ |
| --- | --- | --- | --- |
|  | D = −2.79056·10⁻⁸ | E = −9.84857·10⁻¹² | F = −6.72819·10⁻¹² |
| R8: | A = 0 | B = −8.47132·10⁻⁶ | C = 6.78587·10⁻⁷ |
|  | D = −1.21289·10⁻⁸ |  |  |
| R10: | A = 0.00000·10⁰ | B = 8.65536·10⁻⁵ | C = 5.82389·10⁻⁸ |
|  | D = 3.33795·10⁻⁸ | E = −6.24444·10⁻¹⁰ | F = 5.86015·10⁻¹² |
| R13: | A = 0 | B = 1.07415·10⁻⁵ | C = −7.88153·10⁻⁸ |
|  | D = 5.47962·10⁻¹⁰ |  |  |

Phase Coefficients:

| R8: | C2 = −1.00395·10⁻³ | C4 = 2.66549·10⁻⁶ | C6 = 1.18927·10⁻⁷ |
| --- | --- | --- | --- |
|  | C8 = 1.45162·10⁻⁹ |  |  |
| R11: | C2 = 1.72371·10⁻³ | C4 = −1.35624·10⁻⁵ | C6 = 7.10899·10⁻⁸ |

Numerical Example 6

| f = 25.0 ~ 47.0 | Fno = 4.5 ~ 6.2 | 2ω = 69.2 ~ 40.3 |
| --- | --- | --- |
| R1 = 9.880 | D1 = 1.30 | N1 = 1.575006 | v1 = 41.5 |
| R2 = 16.403 | D2 = 1.02 |  |  |
| R3 = −15.098 | D3 = 1.60 | N2 = 1.846659 | v2 = 23.8 |
| R4 = −24.633 | D4 = 1.10 |  |  |
| R5 = Stop | D5 = 2.33 |  |  |
| *R6 = 33.634 | D6 = 2.30 | N3 = 1.583126 | v3 = 59.4 |
| *R7 = −16.927 | D7 = Variable |  |  |
| R8 = −24.197 | D8 = 2.10 | N4 = 1.669100 | v4 = 55.4 |
| *R9 = −14.863 | D9 = 3.29 |  |  |
| R10 = −8.013 | D10 = 1.10 | N5 = 1.772499 | v5 = 49.6 |
| *R11 = −35.734 |  |  |  |

| Variable Separation | Focal Length | | |
| --- | --- | --- | --- |
|  | 25.00 | 31.78 | 47.00 |
| D7 | 6.79 | 4.02 | 0.72 |

Aspheric Coefficients:

| R6: | A = 0.00000·10⁰ | B = −1.11939·10⁻⁴ | C = 1.46479·10⁻⁶ |
| --- | --- | --- | --- |
|  | D = −1.79522·10⁻⁷ | E = 3.23810·10⁻⁹ |  |

-continued

| R9: | A = 0 | B = −9.86627·10⁻⁵ | C = −9.93546·10⁻⁸ |
| --- | --- | --- | --- |
|  | D = −7.26351·10⁻⁸ | E = 7.59055·10⁻¹⁰ | F = 5.8794·10⁻¹² |
|  | G = −2.3202·10⁻¹³ |  |  |

Phase Coefficients:

| R7: | C2 = −1.23959·10⁻³ | C4 = 8.3075·10⁻⁶ | C6 = 2.53174·10⁻⁷ |
| --- | --- | --- | --- |
|  | C8 = −3.30477·10⁻⁹ |  |  |
| R11: | C2 = 1.69075·10⁻³ | C4 = −1.19685·10⁻⁶ | C6 = −4.88669·10⁻⁸ |
|  | C8 = 3.69246·10⁻¹⁰ |  |  |

Numerical Example 7

| f = 25.0 ~ 47.0 | Fno = 4.5 ~ 6.0 | 2ω = 69.2 ~ 40.3 |
| --- | --- | --- |
| R1 = 9.749 | D1 = 1.30 | N1 = 1.517417 | v1 = 52.4 |
| R2 = 18.049 | D2 = 1.08 |  |  |
| R3 = −16.066 | D3 = 1.80 | N2 = 1.846659 | v2 = 23.8 |
| R4 = −35.089 | D4 = 0.90 |  |  |
| R5 = Stop | D5 = 2.07 |  |  |
| *R6 = 30.522 | D6 = 2.50 | N3 = 1.583126 | v3 = 59.4 |
| R7 = −14.766 | D7 = Variable |  |  |
| *R8 = −24.108 | D8 = 2.00 | N4 = 1.669100 | v4 = 55.4 |
| *R9 = −15.738 | D9 = 3.72 |  |  |
| R10 = −7.830 | D10 = 1.10 | N5 = 1.712995 | v5 = 53.8 |
| R11 = −39.932 |  |  |  |

| Variable Separation | Focal Length | | |
| --- | --- | --- | --- |
|  | 25.00 | 31.76 | 47.00 |
| D7 | 6.79 | 4.03 | 0.72 |

Aspheric Coefficients:

| R6: | A = 0 | B = −1.2764·10⁻⁴ | C = 8.94366·10⁻⁷ |
| --- | --- | --- | --- |
|  | D = −1.40401·10⁻⁷ | E = 1.45866·10⁻⁹ |  |
| R9: | A = 0 | B = −6.61907·10⁻⁵ | C = −1.12234·10⁻⁶ |
|  | D = −5.76607·10⁻⁸ | E = 7.54810·10⁻¹⁰ | F = 3.04643·10⁻¹² |
|  | G = −1.74614·10⁻¹³ |  |  |
| R8: | A = 0 | B = −7.32508·10⁻¹¹ | C = −3.82939·10⁻¹³ |
|  | D = −1.51103·10⁻¹⁵ | E = −7.37501·10⁻¹⁶ |  |

Phase Coefficients:

| R6: | C2 = −4.57377·10⁻⁴ | C4 = 1.01456·10⁻⁵ | C6 = 6.53778·10⁻⁷ |
| --- | --- | --- | --- |
|  | C8 = −3.45252·10⁻⁸ |  |  |
| R8: | C2 = 6.76246·10⁻⁴ | C4 = −3.02685·10⁻⁵ | C6 = 1.18510·10⁻⁶ |
|  | C8 = −1.86918·10⁻⁸ |  |  |

Numerical Example 8

| f = 24.0 ~ 46.0 | Fno = 3.5 ~ 6.2 | 2ω = 71.4 ~ 41.1 |
| --- | --- | --- |
| R1 = 11.183 | D1 = 1.20 | N1 = 1.517417 | v1 = 52.4 |
| R2 = 15.038 | D2 = 0.79 |  |  |
| R3 = −55.298 | D3 = 0.95 | N2 = 1.677900 | v2 = 55.3 |
| *R4 = 190.585 | D4 = 1.00 |  |  |
| R5 = Stop | D5 = 1.72 |  |  |
| R6 = 42.751 | D6 = 0.90 | N3 = 1.846660 | v3 = 23.8 |
| R7 = 18.983 | D7 = 0.91 |  |  |
| R8 = 23.562 | D8 = 2.70 | N4 = 1.603112 | v4 = 60.7 |
| *R9 = −10.171 | D9 = Variable |  |  |
| R10 = −23.997 | D10 = 2.00 | N5 = 1.647689 | v5 = 33.8 |
| *R11 = −15.388 | D11 = 3.65 |  |  |
| R12 = −8.141 | D12 = 1.10 | N6 = 1.712995 | v6 = 53.9 |
| *R13 = −62.473 |  |  |  |

| Variable Separation | Focal Length | | |
| --- | --- | --- | --- |
|  | 24.00 | 30.70 | 46.00 |
| D9 | 6.59 | 3.95 | 0.80 |

Aspheric Coefficients:

| R4: | A = 0.00000·10⁰ | B = 3.03785·10⁻⁴ | C = −4.96896·10⁻⁸ |
| --- | --- | --- | --- |
|  | D = 2.17463·10⁻⁷ |  |  |
| R9: | A = −2.50723·10⁻⁸ | B = 1.70205·10⁻¹⁰ | C = 3.51108·10⁻¹³ |
|  | D = 6.47271·10⁻¹⁶ |  |  |
| R11: | A = 0.00000·10⁰ | B = −8.68396·10⁻⁵ | C = 4.77609·10⁻⁸ |
|  | D = −3.01109·10⁻⁸ | E = 3.56443·10⁻¹¹ |  |
| R13: | A = −1.75606·10⁻⁸ | B = 1.30383·10⁻¹⁰ | C = 8.18777·10⁻¹³ |

-continued

Phase Coefficients:

R9:  $C2 = -6.16106 \cdot 10^{-4}$  $C4 = -3.44559 \cdot 10^{-6}$  $C6 = 3.16771 \cdot 10^{-7}$
     $C8 = -8.71789 \cdot 10^{-9}$
R13: $C2 = 8.83247 \cdot 10^{-4}$  $C4 = -9.06727 \cdot 10^{-6}$  $C6 = 5.11044 \cdot 10^{-8}$ Numerical Example 9

| f = 23.0 ~ 52.0 | | Fno = 4.0 ~ 7.0 | 2ω = 73.8 ~ 36.7 |
|---|---|---|---|
| R1 = 11.290 | D1 = 1.30 | N1 = 1.575006 | ν1 = 41.5 |
| R2 = 13.656 | D2 = 0.82 | | |
| R3 = −37.730 | D3 = 0.95 | N2 = 1.743997 | ν2 = 44.8 |
| *R4 = 265.542 | D4 = 1.30 | | |
| R5 = Stop | D5 = 1.58 | | |
| R6 = 32.042 | D6 = 0.90 | N3 = 1.846660 | ν3 = 23.8 |
| R7 = 18.930 | D7 = 0.57 | | |
| R8 = 21.956 | D8 = 2.70 | N4 = 1.572501 | ν4 = 57.8 |
| *R9 = −9.471 | D9 = Variable | | |
| R10 = −20.573 | D10 = 2.00 | N5 = 1.730770 | ν5 = 40.6 |
| *R11 = −13.576 | D11 = 3.27 | | |
| R12 = −8.141 | D12 = 1.10 | N6 = 1.772499 | ν6 = 49.6 |
| *R13 = −52.484 | | | |

| Variable Separation | Focal Length | | |
|---|---|---|---|
| | 23.00 | 31.95 | 52.00 |
| D9 | 7.43 | 4.06 | 0.72 |

Aspheric Coefficients:

R4:   $A = 0.00000 \cdot 10^{0}$   $B = 2.55577 \cdot 10^{-4}$   $C = 6.37879 \cdot 10^{-6}$
      $D = 1.17157 \cdot 10^{-8}$
R9:   $A = -2.50723 \cdot 10^{-8}$  $B = 6.53118 \cdot 10^{-5}$  $C = -1.52688 \cdot 10^{-6}$
      $D = 4.85868 \cdot 10^{-8}$
R11:  $A = 0.00000 \cdot 10^{0}$   $B = -5.79810 \cdot 10^{-5}$  $C = -1.14126 \cdot 10^{-6}$
      $D = -2.68089 \cdot 10^{-8}$  $E = 2.53796 \cdot 10^{-10}$
R13:  $A = -1.75606 \cdot 10^{-8}$  $B = -2.67453 \cdot 10^{-5}$  $C = 7.40356 \cdot 10^{-7}$
      $D = -5.12038 \cdot 10^{-9}$ Phase Coefficients:

R9:  $C2 = -1.09512 \cdot 10^{-3}$  $C4 = -1.17823 \cdot 10^{-5}$  $C6 = 4.78071 \cdot 10^{-7}$
R13: $C2 = 1.62227 \cdot 10^{-3}$  $C4 = -1.02612 \cdot 10^{-5}$  $C6 = 1.82451 \cdot 10^{-8}$
     $C8 = 3.69589 \cdot 10^{-10}$ FIGS. 28A to 28D through FIGS. 30A to 30D graphically show the aberrations of the zoom lens of the numerical example 4 in the wide-angle end, the middle focal length position and the telephoto end, respectively. FIGS. 31A to 31D through FIGS. 33A to 33D graphically show the aberrations of the zoom lens of the numerical example 5 in the wide-angle end, the middle focal length position and the telephoto end, respectively. FIGS. 34A to 34D through FIGS. 36A to 36D graphically show the aberrations of the zoom lens of the numerical example 6 in the wide-angle end, the middle focal length position and the telephoto end, respectively. FIGS. 37A to 37D through FIGS. 39A to 39D graphically show the aberrations of the zoom lens of the numerical example 7 in the wide-angle end, the middle focal length position and the telephoto end, respectively. FIGS. 40A to 40D through FIGS. 42A to 42D graphically show the aberrations of the zoom lens of the numerical example 8 in the wide-angle end, the middle focal length position and the telephoto end, respectively. FIGS. 43A to 43D through FIGS. 45A to 45D graphically show the aberrations of the zoom lens of the numerical example 9 in the wide-angle end, the middle focal length position and the telephoto end, respectively.

The values of the factors in the above-described conditions (5) to (12) for the numerical examples 4 to 9 are listed in a table below.

| Condition | Numerical Example | | | | | |
|---|---|---|---|---|---|---|
| No. | 4 | 5 | 6 | 7 | 8 | 9 |
| (5) | 0.38 | 0.37 | 0.45 | 0.47 | 0.22 | 0.18 |
| (6) | 1.517 | 1.517 | 1.575 | 1.517 | 1.517 | 1.575 |
| (7) | 52.4 | 52.4 | 41.5 | 52.4 | 52.4 | 41.5 |
| (8) | — | — | 0.10 | 0.00 | 0.03 | 0.15 |
| (9) | −9.57* | −10.0* | −12.4* | −4.57* | −6.16* | −11.0* |
| (10) | 15.2* | 17.2* | 16.9* | 6.76* | 8.83* | 16.2* |
| (11) | 0.73 | 0.72 | 0.73 | 0.73 | 0.71 | 0.73 |
| (12) | 0.62 | 0.62 | 0.71 | 0.71 | 0.71 | 0.72 |

(* = $\cdot 10^{-4}$)

As described above, the present embodiment (numerical examples 4 to 9) constructs the zoom lens in the form of the 2-unit type comprising a first lens unit of positive refractive power and a second lens unit of negative refractive power with inclusion of the diffractive optical element or elements as effectively used to improve the compact form of the entire lens system while still permitting a high optical performance to be maintained stable over the entire zooming range.

What is claimed is:

1. A zoom lens comprising, in order from an object side to an image side, a first lens unit of positive refractive power, a second lens unit of refractive power and a third lens unit of negative refractive power, wherein said first, second and third lens units are moved such that, during zooming from a wide-angle end to a telephoto end, a separation between said first lens unit and said second lens unit increases and a separation between said second lens unit and said third lens unit decreases, and wherein said zoom lens has a diffractive surface, and wherein said first lens unit consists of a negative lens and a positive lens, and said positive lens and said negative lens are disposed in the order from the object side to the image side.

2. A zoom lens according to claim 1, wherein said diffractive surface is included in said third lens unit.

3. A zoom lens according to claim 1, wherein said diffractive surface is included in said second lens unit.

4. A zoom lens according to claim 1, wherein said third lens unit consists of a single lens.

5. A zoom lens according to claim 1, wherein said diffractive surface is composed of a diffraction grating of revolution symmetry with respect to an optical axis, and, as a phase φ(h) of said diffraction grating is given by $$\phi(h) = (2\pi/\lambda) \cdot (C2 \cdot h^2 + C4 \cdot h^4 + C6 \cdot h^6 + \ldots + Ci \cdot h^i)$$

where h is a height from the optical axis, λ is a wavelength, and Ci is a phase coefficient for a term in the i-th degree, said zoom lens satisfies the following condition:

$$C2 > 0.$$

6. A zoom lens according to claim 5, satisfying the following condition:

$$C4 < 0.$$

7. A zoom lens according to claim 5, where said diffractive surface is included in said third lens unit, and said zoom lens satisfies the following condition:

$$-40 < Fbo/fw < -5$$

where Fbo is a focal length of the diffractive surface in said third lens unit, and fw is a focal length of said zoom lens in the wide-angle end.

8. A zoom lens according to claim 1, wherein said third lens unit contributes to a greatest variation of magnification among said first to third lens units.

9. A zoom lens according to claim 1, further comprising a stop positioned on the object side of said second lens unit and arranged to move integrally with said second lens unit during zooming.

10. A zoom lens according to claim 1, wherein said second lens unit consists of a negative lens of meniscus form concave toward the object side and a positive lens, totaling two lenses.

11. A zoom lens according to claim 1, wherein there is a space between said negative lens and said positive lens.

12. A zoom lens according to claim 1, wherein said diffractive surface is included in each of said second lens unit and said third lens unit, and wherein said diffractive surface is composed of a diffraction grating of revolution symmetry with respect to an optical axis and, as a phase $\phi n(H)$ of the diffraction grating in the n-th lens unit is given by $$\phi n(h)=(2\pi/\lambda)\cdot(C2\_n\cdot h^2+C4\_n\cdot h^4+C6\_n\cdot h^6+\ldots)$$

where h is a height from the optical axis, $\lambda$ is a wavelength, and $Ci\_n$ is a phase coefficient for a term in the i-th degree in the n-th lens unit, said zoom lens satisfies the following condition:

$$C2\_2*C2\_3<0$$

where * represents multiplication.

13. A zoom lens according to claim 1, wherein said first, second and third lens units each axially move toward the object side during zooming from the wide-angle end to the telephoto end.

14. A zoom lens according to claim 1, wherein said diffractive surface comprises a first diffraction grating, and a second diffraction grating formed on said first diffraction grating, wherein said first diffraction grating and said second diffraction grating are made of different materials from each other.

15. A zoom lens comprising a plurality of movable lens unit which consist of, in order from an object side to an image side, a first lens unit of positive refractive power, and a second lens unit of negative refractive power, wherein a separation between said first lens unit and said second lens unit is varied to effect zooming, and wherein said first lens unit includes at least three lenses and said first lens unit has a diffractive surface.

16. A zoom lens according to claim 15, wherein said second lens unit includes, in order from the object side, a positive lens and a negative lens.

17. A zoom lens according to claim 15, wherein said diffractive surface included in said first lens unit is composed of a diffraction grating of revolution symmetry with respect to an optical axis, and, as a phase $\phi(h)$ of said diffraction grating is defined as $$\phi(h)=(2\pi/\lambda)\cdot(\Sigma Ci\cdot h^i)$$

where h is a height from the optical axis, $\lambda$ is a wavelength, and Ci is a phase coefficient for a term in the i-th degree, said zoom lens satisfies the following condition:

$$-0.1<C2<0.$$

18. A zoom lens according to claim 15, wherein said second lens unit has a diffractive surface, and wherein said diffractive surface included in said second lens unit is composed of a diffraction grating of revolution symmetry with respect to an optical axis, and, as a phase $\phi(h)$ of said diffraction grating included in said second lens unit is defined as $$\phi(h)=(2\pi/\lambda)\cdot(\Sigma Ci\cdot h^i)$$

where h is a height from the optical axis, $\lambda$ is a wavelength, and Ci is a phase coefficient for a term in the i-th degree, said zoom lens satisfies the following condition:

$$0<C2<0.1.$$

19. A zoom lens according to claim 15, satisfying the following conditions:

$$0.4<f1/fw<0.9$$

$$0.4<|f2/fw|<0.9$$

where f1 and f2 are focal lengths of said first lens unit and said second lens unit, respectively, and fw is a focal length of said zoom lens in a wide-angle end.

20. A zoom lens according to claim 15, wherein each of a positive lens disposed closest to the image side in said first lens unit and a negative lens disposed closest to the image side in said second lens unit is a diffractive surface.

21. A zoom lens according to claim 15, wherein said diffractive surface comprises a first diffraction grating, and a second diffraction grating formed on said first diffraction grating, wherein said first diffraction grating and said second diffraction grating are made of different materials from each other.

22. A zoom lens according to claim 15, wherein each of said first lens unit and said second lens unit has a diffractive surface.

23. A zoom lens comprising a plurality of movable lens unit which consists of, in order from an object side to an image side, a first lens unit of positive refractive power and second lens unit of negative refractive power, wherein a separation between said first lens unit and said second lens unit is varied to effect zooming, and wherein said first lens unit has a positive lens disposed closest to the object side and a negative lens disposed closer to the image side than said positive lens, and said zoom lens has a diffractive surface.

24. A zoom lens according to claim 23, satisfying the following conditions:

$$0<f1/fG1<0.8$$

$$1.48<ndG1<1.70$$

$$30<vdG1<65$$

where f1 is a focal length of said first lens unit, and fG1, ndG1 and vdG1 are a focal length, a refractive index and an Abbe number of a material of said positive lens disposed closest to the object side in said first lens unit, respectively.

25. A zoom lens according to claim 23, wherein said second lens unit comprises, in order from the object side, a positive lens and a negative lens.

26. A zoom lens according to claim 23, wherein said diffractive surface is included in said first lens unit, and wherein said diffractive surface included in said first lens unit is composed of a diffraction grating of revolution symmetry with respect to an optical axis, and, as a phase $\phi(h)$ of said diffraction grating is defined as $$\phi(h)=(2\pi/\lambda)\cdot(\Sigma Ci\cdot h^i)$$

where h is a height from the optical axis, $\lambda$ is a wavelength, and Ci is a phase coefficient for a term in the i-th degree, said zoom lens satisfies the following condition:

$$-0.1 < C2 < 0.$$

27. A zoom lens according to claim 23, wherein said diffractive surface is included in said second lens unit, and wherein said diffractive surface included in said second lens unit is composed of a diffraction grating of revolution symmetry with respect to an optical axis, and, as a phase $\phi(h)$ of said diffraction grating is defined as $$\phi(h) = (2\pi/\lambda) \cdot (\Sigma C_i \cdot h^i)$$

where h is a height from the optical axis, $\lambda$ is a wavelength, and Ci is a phase coefficient for a term in the i-th degree, said zoom lens satisfies the following condition:

$$0 < C2 < 0.1.$$

28. A zoom lens according to claim 23, satisfying the following conditions:

$$0.4 < f1/fw < 0.9$$

$$0.4 < |f2/fw| < 0.9$$

where f1 and f2 are focal lengths of said first lens unit and said second lens unit, respectively, and fw is a focal length of said zoom lens in a wide-angle end.

29. A zoom lens according to claim 23, wherein each of a positive lens disposed closest to the image side in said first lens unit and a negative lens disposed closest to the image side in said second lens unit is a diffractive surface.

30. A zoom lens according to claim 23, wherein said diffractive surface comprises a first diffraction grating, and a second diffraction grating formed on said first diffraction grating, wherein said first diffraction grating and said second diffraction grating are made of different materials from each other.

31. A zoom lens comprising a plurality of movable lens unit which consists of, in order from an object side to an image side, a first lens unit of positive refractive power and a second lens unit of negative refractive power, wherein a separation between said first lens unit and said second lens unit is varied to effect zooming, and wherein said first lens unit has two positive lenses and two negative lenses and said first lens unit has a diffractive surface.

32. A zoom lens according to claim 31, wherein said first lens unit comprises, in order from the object side, a positive lens, a negative lens and a positive lens.

33. A zoom lens according to claim 31, wherein said second lens unit comprises, in order from the object side, a positive lens and a negative lens.

34. A zoom lens according to claim 31, wherein said diffractive surface included in said first lens unit is composed of a diffraction grating of revolution symmetry with respect to an optical axis, and, as a phase $\phi(h)$ of said diffraction grating is defined as $$\phi(h) = (2\pi/\lambda) \cdot (\Sigma C_i \cdot h^i)$$

where h is a height from the optical axis, $\lambda$ is a wavelength, and Ci is a phase coefficient for a term in the i-th degree, said zoom lens satisfies the following condition:

$$-0.1 < C2 < 0.$$

35. A zoom lens according to claim 31, wherein said second lens unit has a diffractive surface, and wherein said diffractive surface included in said second lens unit is composed of a diffraction grating of revolution symmetry with respect to an optical axis, and, as a phase $\phi(h)$ of said diffraction grating included in said second lens unit is defined as $$\phi(h) = (2\pi/\lambda) \cdot (\Sigma C_i \cdot h^i)$$

where h is a height from the optical axis, $\lambda$ is a wavelength, and Ci is a phase coefficient for a term in the i-th degree, said zoom lens satisfies the following condition:

$$0 < C2 < 0.1.$$

36. A zoom lens according to claim 31, satisfying the following conditions:

$$0.4 < f1/fw < 0.9$$

$$0.4 < |f2/fw| < 0.9$$

where f1 and f2 are focal lengths of said first lens unit and said second lens unit, respectively, and fw is a focal length of said zoom lens in a wide-angle end.

37. A zoom lens according to claim 31, wherein each of a positive lens disposed closest to the image side in said first lens unit and a negative lens disposed closest to the image side in said second lens unit is a diffractive surface.

38. A zoom lens according to claim 31, wherein said diffractive surface comprises a first diffraction grating, and a second diffraction grating formed on said first diffraction grating, wherein said first diffraction grating and said second diffraction grating are made of different materials from each other.

39. A zoom lens comprising a plurality of lens unit which consist of, in order from an object side to an image side, a first lens unit of positive refractive power and a second lens unit of negative refractive power, wherein a separation between said first lens unit and said second lens unit is varied to effect zooming, and wherein said first lens unit has one positive lens and two negative lenses, and said first lens unit has a diffractive surface.

40. A zoom lens according to claim 39, wherein said first lens unit comprises, in order from the object side, a positive lens, a negative lens, a negative lens and a positive lens.

41. A zoom lens according to claim 39, wherein second lens unit comprises, in order from the object side, a positive lens and a negative lens.

42. A zoom lens according to claim 39, wherein said diffractive surface included in said first lens unit is composed of a diffraction grating of revolution symmetry with respect to an optical axis, and, as a phase $\phi(h)$ of said diffraction grating is defined as $$\phi(h) = (2\pi/\lambda) \cdot (\Sigma C_i \cdot h^i)$$

where h is a height from the optical axis, $\lambda$ is a wavelength, and Ci is a phase coefficient for a term in the i-th degree, said zoom lens satisfies the following condition:

$$-0.1 < C2 < 0.$$

43. A zoom lens according to claim 39, wherein said second lens unit has a diffractive surface, and wherein said diffractive surface element included in said second lens unit is composed of a diffraction grating of revolution symmetry with respect to an optical axis, and, as a phase $\phi(h)$ of said diffraction grating included in said second lens unit is defined as $$\phi(h) = (2\pi/\lambda) \cdot (\Sigma C_i \cdot h^i)$$

where h is a height from the optical axis, λ is a wavelength, and Ci is a phase coefficient for a term in the i-th degree, said zoom lens satisfies the following condition:

$$0 < C2 < 0.1.$$

44. A zoom lens according to claim 39, satisfying the following conditions:

$$0.4 < f1/fw < 0.9$$
$$0.4 < |f2/fw| < 0.9$$

where f1 and f2 are focal lengths of said first lens unit and said second lens unit, respectively, and fw is a focal length of said zoom lens in a wide-angle end.

45. A zoom lens according to claim 39, wherein each of a positive lens disposed closest to the image side in said first lens unit and a negative lens disposed closest to the image side in said second lens unit is a diffractive surface.

46. A zoom lens according to claim 39, wherein said diffractive surface comprises a first diffraction grating, and a second diffraction grating formed on said first diffraction grating, wherein said first diffraction grating and said second diffraction grating are made of different materials from each other.

47. A zoom lens comprising a plurality of lens unit which consist of, in order from an object side to an image side, a first lens unit of positive refractive power and a second lens unit of negative refractive power, wherein a separation between said first lens unit and said second lens unit is varied to effect zooming, and wherein a stop is disposed within said first lens unit and, when said first lens unit is divided into a front lens sub-unit closer to the object side than the stop and a rear lens sub-unit disposed closer to the image side than the stop, said rear lens sub-unit has a diffractive surface.

48. A zoom lens according to claim 47, satisfying the following condition:

$$f(1b)/f(1a) < 0.4$$

where f(1a) and f(1b) are focal lengths of said front lens sub-unit and said rear lens sub-unit, respectively.

49. A zoom lens according to claim 47, wherein second lens unit comprises, in order from the object side, a positive lens and a negative lens.

50. A zoom lens according to claim 47, wherein said diffractive surface included in said rear lens sub-unit is composed of a diffraction grating of revolution symmetry with respect to an optical axis, and, as a phase φ(h) of said diffraction grating is defined as $$\phi(h) = (2\pi/\lambda) \cdot (\Sigma C i \cdot h^i)$$

where h is a height from the optical axis, λ is a wavelength, and Ci is a phase coefficient for a term in the i-th degree, said zoom lens satisfies the following condition:

$$-0.1 < C2 < 0.$$

51. A zoom lens according to claim 47, wherein said second lens unit has a diffractive surface, and wherein said diffractive surface included in said second lens unit is composed of a diffraction grating of revolution symmetry with respect to an optical axis, and, as a phase φ(h) of said diffraction grating included in said second lens unit is defined as $$\phi(h) = (2\pi/\lambda) \cdot (\Sigma C i \cdot h^i)$$

where h is a height from the optical axis, λ is a wavelength, and Ci is a phase coefficient for a term in the i-th degree, said zoom lens satisfies the following condition:

$$0 < C2 < 0.1.$$

52. A zoom lens according to claim 47, satisfying the following conditions:

$$0.4 < f1/fw < 0.9$$
$$0.4 < |f2/fw| < 0.9$$

where f1 and f2 are focal lengths of said first lens unit and said second lens unit, respectively, and fw is a focal length of said zoom lens in a wide-angle end.

53. A zoom lens according to claim 47, wherein each of a positive lens disposed lens disposed closest to the image side in said first lens unit and a negative lens disposed closest to the image side in said second lens unit is a diffractive surface.

54. A zoom lens according to claim 47, wherein said diffractive surface comprises a first diffraction grating, and a second diffraction grating formed on said first diffraction grating, wherein said first diffraction grating and said second diffraction grating are made of different materials from each other.

55. A zoom lens comprising, in order from an object side, a first lens unit of positive refractive power, a second lens unit of positive refractive power and a third lens unit of negative refractive power, wherein said first, second and third lens units are moved such that, during zooming from a wide-angle end to a telephoto end, a separation between said first lens unit and said second lens unit increases and a separation between said second lens unit and said third lens unit decreases, wherein said zoom lens has a diffractive surface and wherein said first lens unit is consists of a positive lens and a negative lens, and there is a space between said positive and negative lenses.

56. A zoom lens according to claim 55, wherein said diffractive surface is included in said third lens unit.

57. A zoom lens according to claim 55, wherein said diffractive surface is included in said second lens unit.

58. A zoom lens according to claim 55, wherein said third lens unit consists of a single lens.

59. A zoom lens according to claim 55, wherein said diffractive surface is composed of a diffraction grating of revolution symmetry with respect to an optical axis, and, as a phase φ(h) of said diffraction grating is given by $$\phi(h) = (2\pi/\lambda) \cdot (C2 \cdot h^2 + C4 \cdot h^4 + C6 \cdot h^6 + \ldots Ci \cdot h^i)$$

where h is a height from the optical axis, λ is a wavelength and Ci is a phase coefficient for a term in the i-th degree, said zoom lens satisfies the following condition:

$$C2 > 0.$$

60. A zoom lens according to claim 59, satisfying the following condition:

$$C4 < 0.$$

61. A zoom lens according to claim 59, where said diffractive surface is included in said third lens unit, and said zoom lens satisfies the following condition:

$$-40 < Fbo/fw < -5$$

where Fbo is a focal length of a diffractive optical surface of said diffractive surface in said third lens unit, and fw is a focal length of said zoom lens in the wide-angle end.

62. A zoom lens according to claim 55, wherein said third lens unit contributes to a greatest variation of magnification among said first to third lens units.

63. A zoom lens according to claim 55, further comprising a stop positioned on the object side of said second lens unit and arranged to move integrally with said second lens unit during zooming.

64. A zoom lens according to claim 55, wherein said second lens unit consists of negative lens of meniscus form concave toward the object side and a positive lens, totaling two lenses.

65. A zoom lens according to claim 55, wherein said diffractive surface is included in each of said second lens unit and said third lens unit, and wherein said diffractive surface is composed of a diffraction grating of revolution symmetry with respect to an optical axis and, as a phase $\phi n(h)$ of the diffraction grating in the n-th lens unit given by $$\phi n(h) = (2\pi/\lambda) \cdot (C2\_n \cdot h^2 + C4\_n \cdot h^4 + C6\_n \cdot h^6 + \ldots)$$

where h is a height from the optical axis, $\lambda$ is a wavelength, and $Ci\_n$ is a phase coefficient for a term in the i-th degree in the n-th lens unit, said zoom lens satisfies the following condition:

$$C2\_2 \cdot C2\_3 < 0$$

where · represents multiplication.

66. A zoom lens according to claim 55, wherein said first, second and third lens units axially move toward the object side during zooming from the wide-angle end to the telephoto end.

67. A zoom lens according to claim 55, wherein said diffractive surface comprises a first diffraction grating, and a second diffraction grating formed on said first diffracting grating, wherein said first diffraction grating and said second diffraction grating are made of different materials from each other.

* * * * *

UNITED STATES PATENT AND TRADEMARK OFFICE
CERTIFICATE OF CORRECTION

PATENT NO.     : 6,215,600 B1
DATED          : April 10, 2001
INVENTOR(S)    : Takeshi Nishimura et al.

It is certified that error appears in the above-identified patent and that said Letters Patent is hereby corrected as shown below:

Column 1,
Line 49, delete "9-19273" and insert -- 9-197273 --.

Column 17,
Line 44, delete "$C6 = 1.18927 \cdot 10^{-7}$" and insert -- $C6 = -1.18927 \cdot 10^{-7}$ --.

Signed and Sealed this

Thirtieth Day of April, 2002

Attest:

Attesting Officer

JAMES E. ROGAN
Director of the United States Patent and Trademark Office